United States Patent
Anderson et al.

(10) Patent No.: US 6,786,233 B1
(45) Date of Patent: Sep. 7, 2004

(54) BOOM UTILIZING COMPOSITE MATERIAL CONSTRUCTION

(75) Inventors: Thomas M. Anderson, Dellwood, MN (US); David R. Bissen, Plymouth, MN (US); Lawrence P. Schmidt, Lino Lakes, MN (US); Brian E. Spencer, Sacramento, CA (US); Leo B. Willner, Santa Cruz, CA (US); Richard T. Atherton, Excelsior, MN (US); Richard L. Grover, Whittier, CA (US)

(73) Assignee: Schwing America, Inc., White Bear, MN (US)

( * ) Notice: Subject to any disclaimer, the term of this patent is extended or adjusted under 35 U.S.C. 154(b) by 345 days.

(21) Appl. No.: 10/081,743

(22) Filed: Feb. 22, 2002

Related U.S. Application Data

(60) Provisional application No. 60/278,798, filed on Mar. 26, 2001, provisional application No. 60/278,132, filed on Mar. 23, 2001, provisional application No. 60/271,095, filed on Feb. 23, 2001, and provisional application No. 60/271,094, filed on Feb. 23, 2001.

(51) Int. Cl.[7] ............................................. B65G 53/32

(52) U.S. Cl. .................................... 137/615; 141/387
(58) Field of Search ....................... 137/615; 141/387, 141/388

(56) References Cited

U.S. PATENT DOCUMENTS

| | | | |
|---|---|---|---|
| 3,742,985 A | 7/1973 | Rubenstein | ............... 138/141 |
| 3,947,191 A | 3/1976 | Milner, Jr. | ............... 403/334 |
| 3,955,600 A | 5/1976 | Tamburello | ............... 138/141 |
| 3,958,377 A | 5/1976 | Milner, Jr. | ............... 52/118 |
| 3,964,512 A | 6/1976 | Dumas | ............... 137/615 |
| 3,997,695 A | * 12/1976 | Gitt et al. | ............... 428/34.5 |
| 4,037,626 A | 7/1977 | Roberts, Jr. | ............... 138/109 |
| 4,047,354 A | 9/1977 | Sutherland | ............... 52/729 |
| 4,070,021 A | 1/1978 | Cecka et al. | ............... 27/73 F |
| 4,171,626 A | * 10/1979 | Yates et al. | ............... 464/181 |
| 4,212,461 A | 7/1980 | Cecka et al. | ............... 273/73 F |

(List continued on next page.)

OTHER PUBLICATIONS

Jim Moriarty, London Underground Ltd., Frazer Barnes, Devonport Royal Dockyard Ltd., *The Use of Carbon Fiber Composites in the London Underground Limited Civil Infrastructure Rehabilitation Program*, SAMPE Journal, Mar./Apr. 1998, vol. 34, No. 2.

Schwing America, Inc. sales brochure, "Technology of truck–mounted concrete pumps with palcing booms."

Schwing America, Inc. sales brochure, "KVM 28, KVM 32, DVM 32, DVM 42 Separate Placing Booms", Feb. 1999, 4 pages.

"Frequent Flyer Program for Concrete Booms", Concrete Construction Magazine, 4 pages, published prior to Feb. 21, 2001.

"KVM 28/28X Load Chart Wall Supported", Schwing America, Inc., Marketing drawing, 1 page, distributed prior to Feb. 21, 2001.

"Putzmeister America MXR32 Placing Boom Standard Layout", Putzmeister America Marketing drawing, 4 pages, received prior to Feb. 21, 2001.

Schwing America, Inc. sales brochure, "Separate Placing Booms and Their Fields of Application," published prior to Feb. 21, 2001.

*Primary Examiner*—Kevin Lee
(74) *Attorney, Agent, or Firm*—Kinney & Lange, P.A.

(57) ABSTRACT

The present invention is a boom system comprising a first boom section having a distal end and a proximal end. A second boom section includes a distal end and a proximal end, wherein the proximal end of the second boom section is rotatably coupled to the distal end of the first boom section. At least one of the boom sections is substantially formed from composite materials.

21 Claims, 13 Drawing Sheets

U.S. PATENT DOCUMENTS

| | | | | |
|---|---|---|---|---|
| 4,290,836 | A | 9/1981 | McPherson et al. | 156/171 |
| 4,357,962 | A | 11/1982 | Shaw et al. | 138/125 |
| 4,410,013 | A | 10/1983 | Sasaki et al. | 138/149 |
| 4,412,882 | A | 11/1983 | Morimoto et al. | 156/188 |
| 4,450,873 | A | 5/1984 | Sadler et al. | 138/174 |
| 4,515,737 | A | 5/1985 | Karino et al. | 264/22 |
| 4,515,861 | A | 5/1985 | Arup | 428/450 |
| 4,518,556 | A | 5/1985 | Yamamoto et al. | 264/295 |
| 4,553,899 | A | 11/1985 | Magni | 414/629 |
| 4,729,541 | A | 3/1988 | Maier | 249/18 |
| 4,845,867 | A | 7/1989 | Albrecht | 37/117.5 |
| 4,874,661 | A | 10/1989 | Browne et al. | 428/246 |
| 4,888,247 | A | 12/1989 | Zweben et al. | 428/105 |
| 4,907,624 | A | 3/1990 | Jonasson | 38/125 |
| 5,035,850 | A | 7/1991 | Yoshikawa et al. | 264/256 |
| 5,048,441 | A | 9/1991 | Quigley | 114/90 |
| 5,097,585 | A | 3/1992 | Klemm | 29/523 |
| 5,106,443 | A | 4/1992 | Burba et al. | 156/175 |
| 5,127,272 | A | 7/1992 | Dean et al. | 73/861.04 |
| 5,130,165 | A | 7/1992 | Shao et al. | 427/330 |
| 5,144,710 | A | 9/1992 | Grossman | 14/73 |
| 5,183,316 | A | 2/1993 | Ottestad | 299/69 |
| 5,188,872 | A | 2/1993 | Quigley | 428/36.2 |
| 5,222,769 | A | 6/1993 | Kaempen | 285/45 |
| 5,251,420 | A | 10/1993 | Johnson | 52/664 |
| 5,334,429 | A | 8/1994 | Imoto et al. | 428/36.2 |
| 5,403,537 | A | 4/1995 | Seal et al. | 264/511 |
| 5,411,060 | A | 5/1995 | Chandler | 138/98 |
| 5,426,907 | A | 6/1995 | Franklin | 52/749 |
| 5,553,439 | A | 9/1996 | Grossman | 52/745.2 |
| 5,573,348 | A | 11/1996 | Morgan | 405/52 |
| 5,575,526 | A | 11/1996 | Wycech | 296/205 |
| 5,580,626 | A | 12/1996 | Quigley et al. | 428/36.2 |
| 5,617,692 | A | 4/1997 | Johnson et al. | 52/651.02 |
| 5,624,519 | A | 4/1997 | Nelson et al. | 156/245 |
| 5,672,227 | A | 9/1997 | Chiu | 156/295 |
| 5,722,589 | A | 3/1998 | Richards | 238/84 |
| 5,746,286 | A * | 5/1998 | Mlaker | 182/2.9 |
| 5,944,441 | A | 8/1999 | Schütze | 403/403 |
| 6,142,180 | A | 11/2000 | Woodling et al. | 137/615 |

* cited by examiner

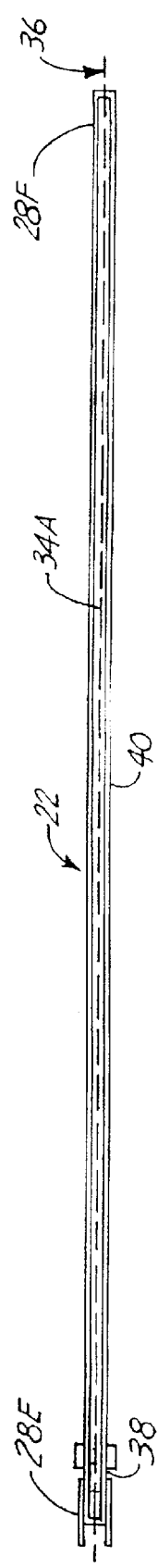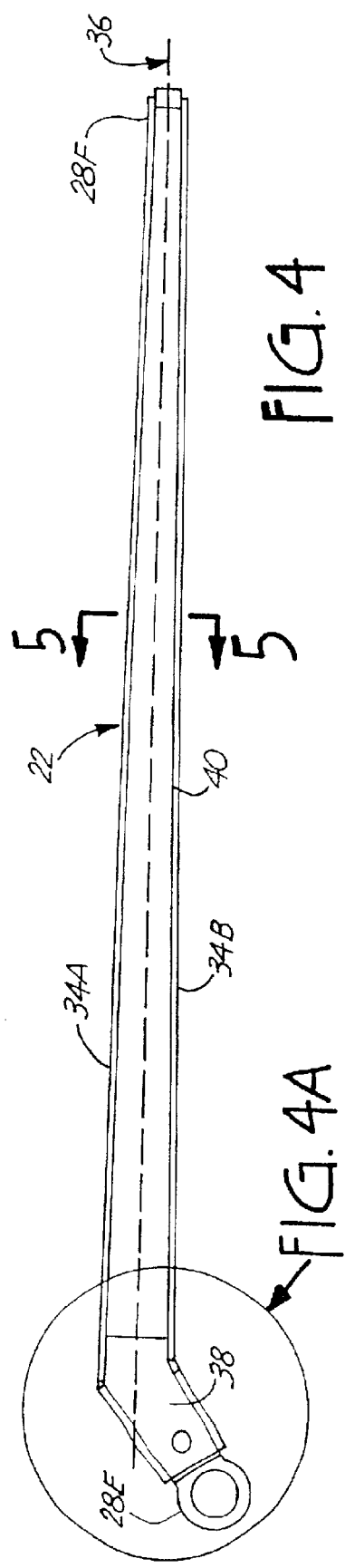

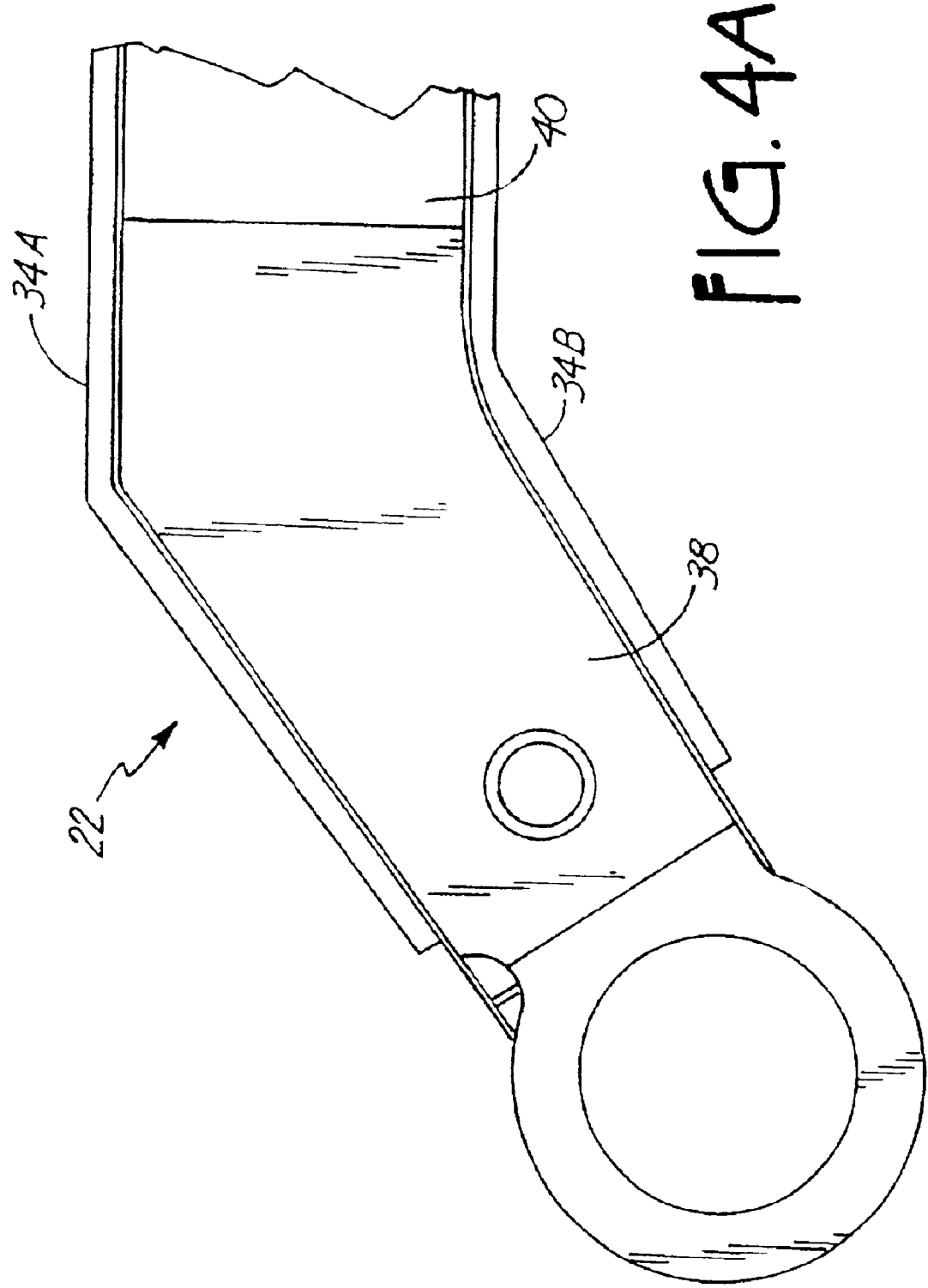

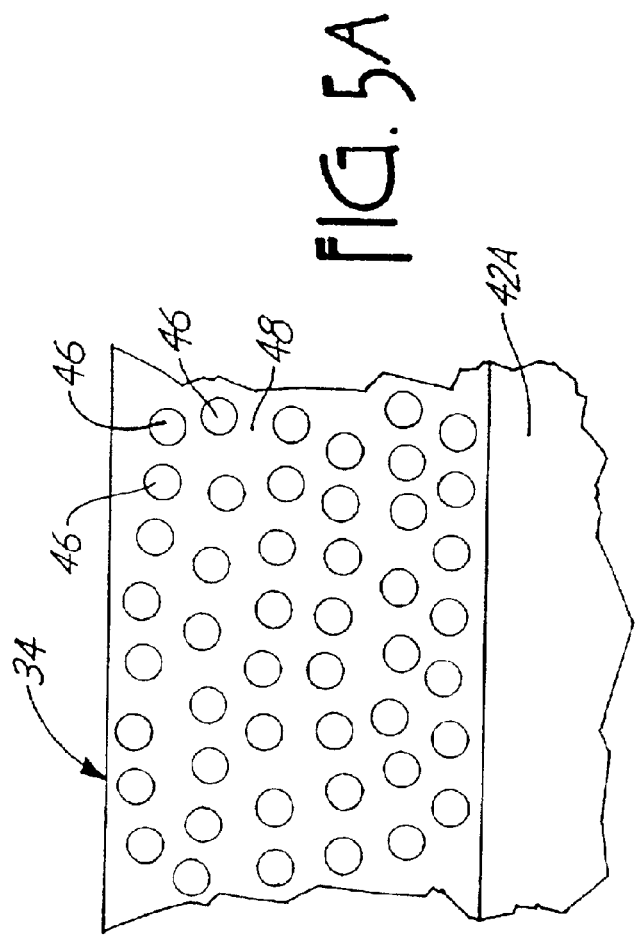
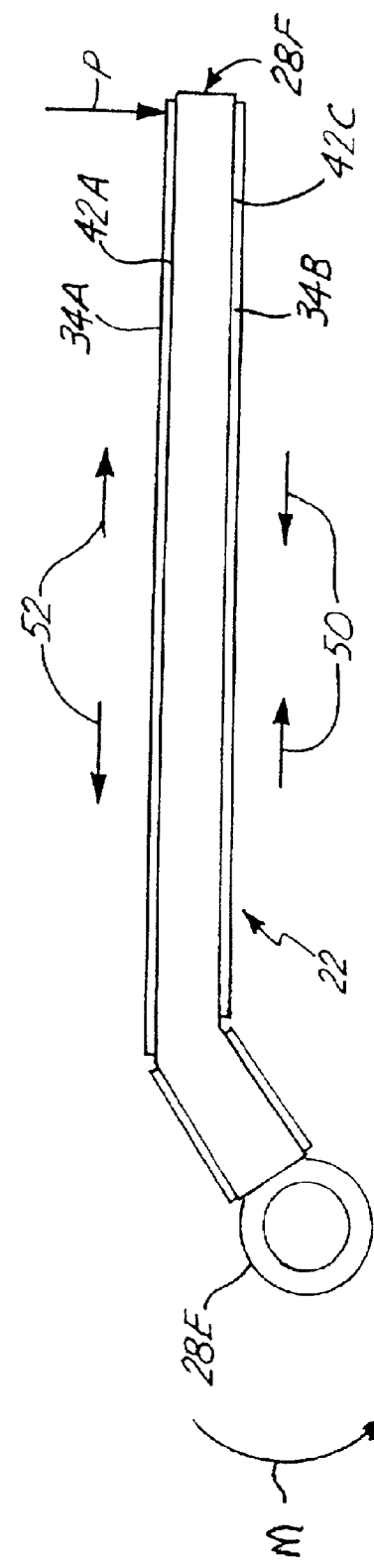

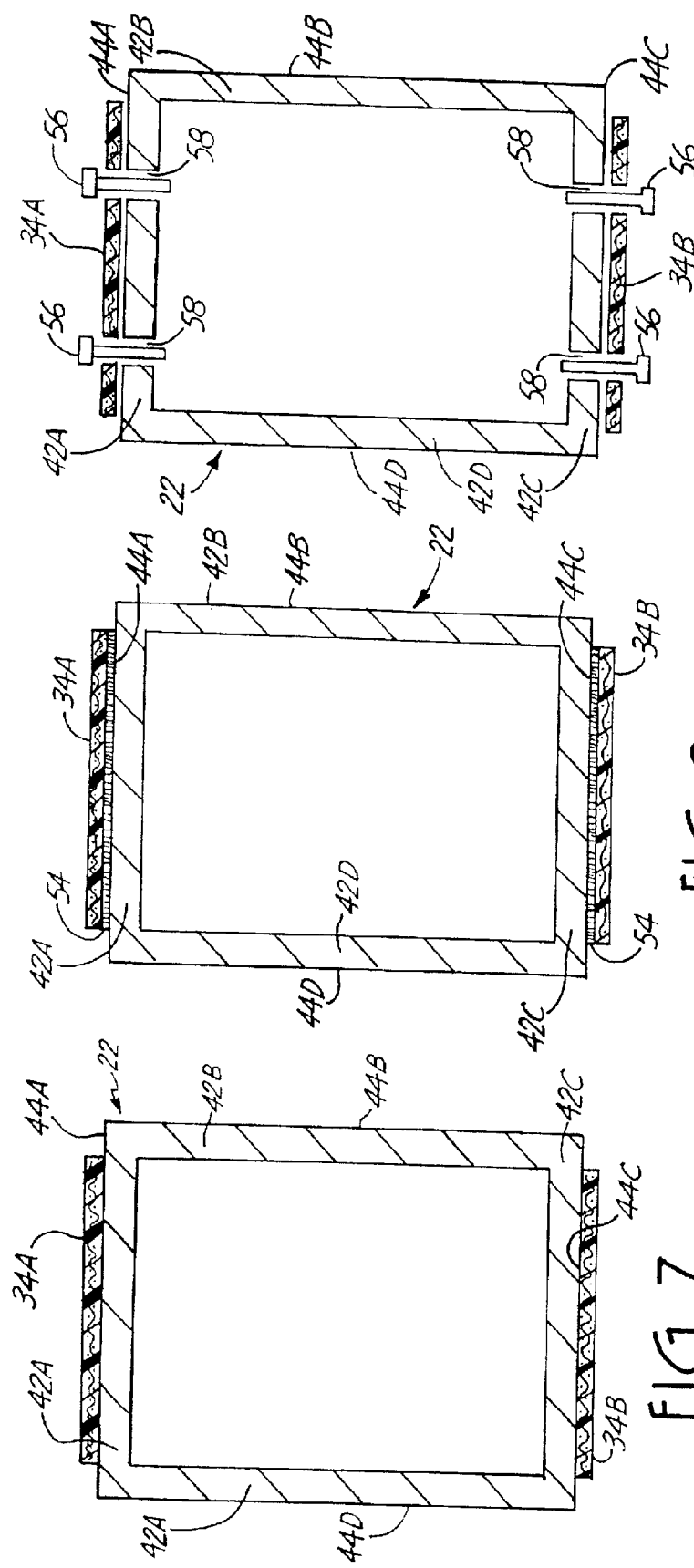

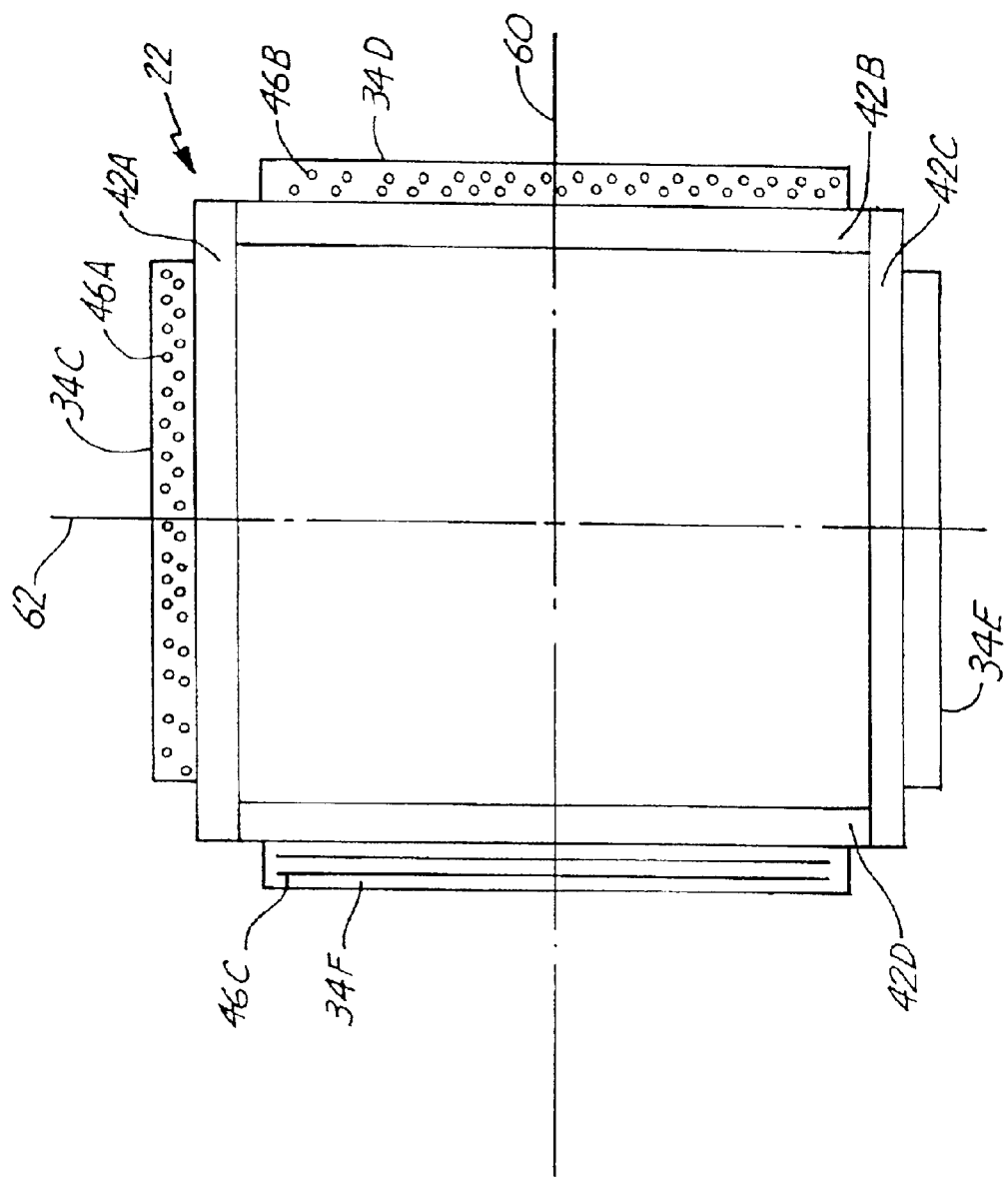

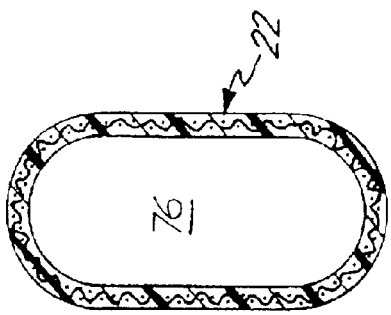
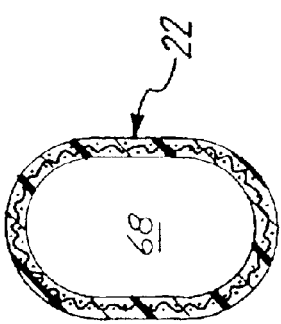
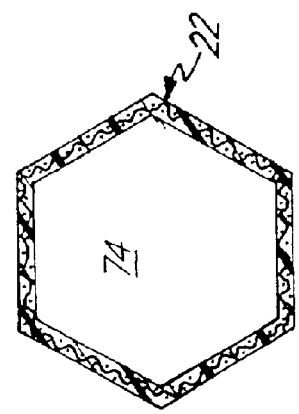
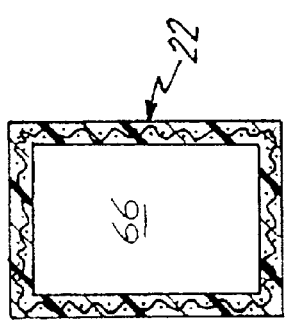
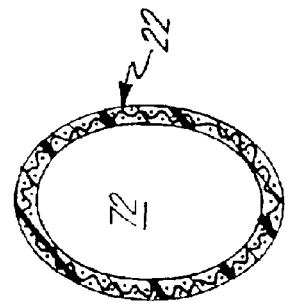

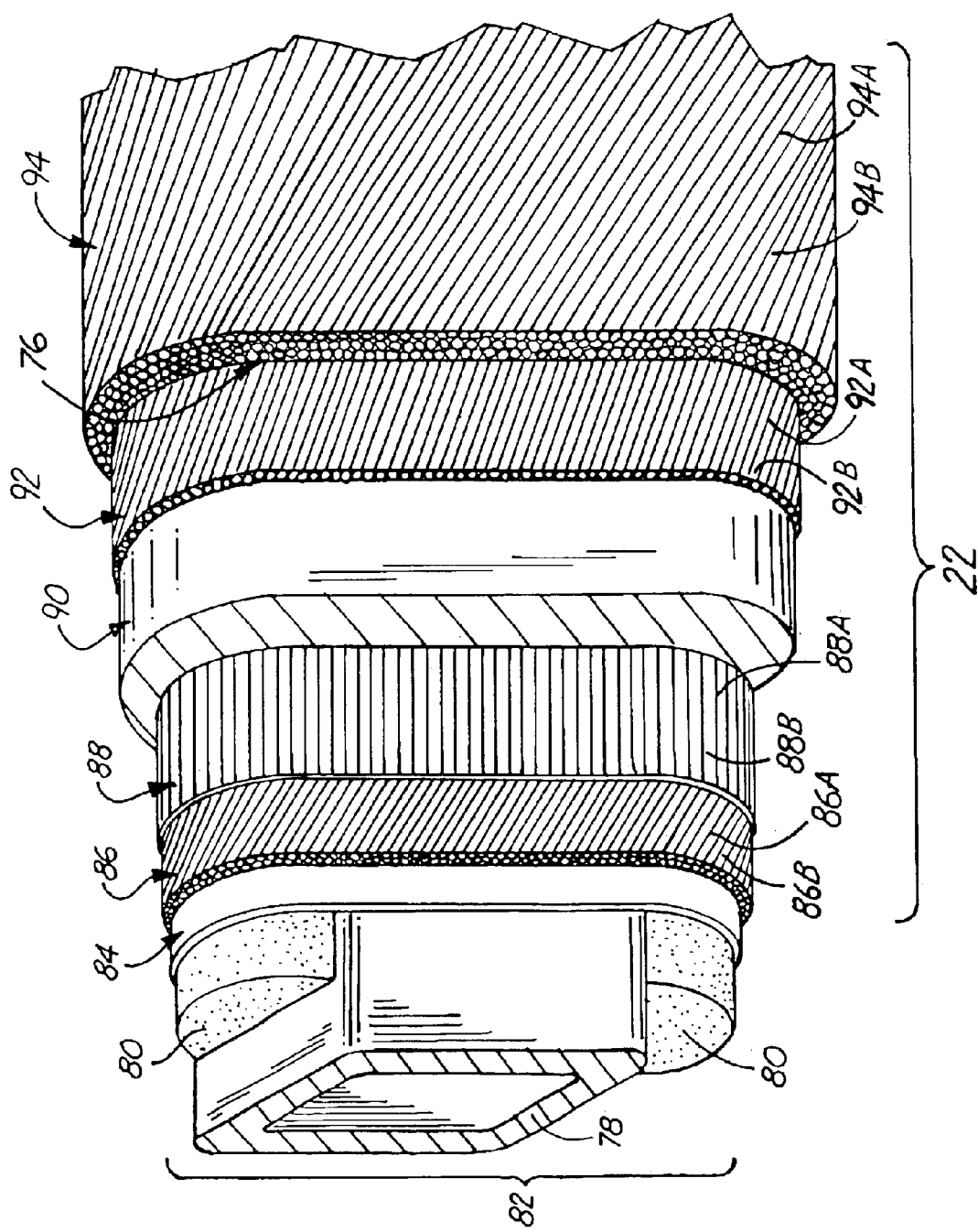

BOOM UTILIZING COMPOSITE MATERIAL CONSTRUCTION

CROSS REFERENCE TO RELATED APPLICATIONS

This application claims the benefit of U.S. Provisional Application Nos. 60/271,094 filed Feb. 23, 2001 for "Boom Stiffening System" by T. Anderson, L. Schmidt, D. Bissen, B. Spencer, R. Grover and L. Willner; 60/271,095 filed Feb. 23, 2001 for "Conveying Pipeline Mounted Inside A Boom" by T. Anderson, L. Schmidt, D. Bissen, B. Spencer and L. Willner; 60/278,798 filed Mar. 26, 2001 for "Composite Material Piping System" by D. Bissen, L. Schmidt, B. Spencer and L. Willner; 60/278,132 filed Mar. 23, 2001 for "Boom Utilizing Composite Material Construction" by T. Anderson, D. Bissen, L. Schmidt, R. Atherton, B. Spencer, L. Willner and R. Grover, all of which are incorporated by reference herein.

BACKGROUND OF THE INVENTION

The present invention relates to a conveying or hoisting boom system. In particular, the present invention increases the stiffness and the load bearing capacity of a conveying or hoisting boom system and attached pipeline by incorporating a composite reinforcement fiber matrix into its construction.

Boom systems offer a safe, cost effective and efficient method of lifting a load and reaching to a distant elevated position. Boom systems can be mounted on portable platforms such as trucks. Truck mounted booms are used as portable lifting and moving mechanisms, as well as to support piping for pumping liquids or semi-liquids (such as concrete, slurries, grout and industrial or waste material). Booms which support piping may be used in a variety of applications ranging from pumping concrete at construction sites to directing water onto upper stories of buildings. Boom systems typically have more than one boom section. Each boom section has a corresponding actuator assembly which supports and moves the boom section (for example by articulating or telescoping the sections).

Each boom section acts as a cantilevered beam (with no support laterally along its length). Booms are frequently subjected to work conditions where the loads supported by the boom system place significant stress and strain upon the boom sections. It is important that the boom sections have a sufficient load bearing capacity to perform such activities. Additionally, the boom systems can be subject to excessive vibrations and deflections which can interfere with safe and effective operation. Vibrations, deflections and flexural stresses are used as design criteria and serve to limit the operational reach of the boom systems.

In some applications, the booms must be articulated with a high level of precision to allow proper positioning of the boom and to avoid undesired contact (or impact) with external objects which can cause damage to the boom sections. Pipelines attached externally to the boom sections are particularly vulnerable to damage from contact with external objects. The required precise positioning of the boom is hindered by a condition known as "boom bounce." Boom bounce is a periodic movement of the boom proportional to the flexibility and length of the boom and to the magnitude of the applied force. A force which is applied to the boom (particularly if applied at the unsupported distal end) causes flexing of the boom. When the force is released, the boom acts like a spring, oscillating around its equilibrium position. When the boom is subject to sudden acceleration or deceleration, the weight of the boom itself can cause an inertial force to be applied to the boom resulting in the above described "boom bounce." It is important, therefore, for each boom section to be stiff enough to minimize boom bounce.

As mentioned, significant stress and strain can be placed upon the boom sections by the weight of the load being supported by the boom system. Additionally, the weight of the boom itself and any attached pipeline can cause stress and strain upon the boom sections. Therefore, while it is important that the boom have significant stiffness and load bearing capacity, it is equally important that the boom and attached pipeline have as little weight as is reasonably possible. The weight of a boom and pipeline at a boom section distal from the truck must be supported by the boom sections proximate the truck. Since each boom acts as a cantilever, the greater the weight of the boom sections, pipeline, and the load supported by the boom, the greater the moment generated by the boom with respect to the support system. A "moment" can be defined as the product of a force and the distance to a particular axis or point. If the boom is extended horizontally, the weight of the boom is moved farther away from the center of gravity of the boom and support system creating a larger moment about the support system. The increased moment causes an increased likelihood that the boom and support system may become unstable from dynamic or static load and tip over. Therefore, any increase in weight, will decrease the stability and reach of a boom system. If a pipeline is attached to the boom system, it may be cantilevered from the end of a boom and must have the ability to support itself over a span, requiring the pipeline to be strong as well as lightweight.

Stress and strain causing forces can be applied to the boom in a number of ways. For example, when the boom contacts an external object, or an object is suspended from the end of the boom, an external force is applied to the boom. Alternatively, when the boom is subject to sudden acceleration or deceleration, the weight of the boom itself causes an inertial force to be applied to the boom (resulting in the boom bounce described above).

Any pipeline attached to the boom sections is typically used to pump liquids or semi-liquids under pressure (e.g. using piston style pumps). Typically, forces also act on the pipeline with each stroke of the piston. The resulting stress on the pipeline and boom sections is called "line shock." The force from the line shock causes the fluid to push transversely and/or longitudinally in a cyclical fashion against the pipe (and therefore the boom), producing a force normal or axial to the longitudinal axis of the boom. In some styles of pumps, impulse loads can be imposed on the boom system due to initial pressures (i.e., pressures which occur when the pump is started) imposed in the system, such as with centrifugal pumps.

Currently, boom sections and piping are typically manufactured of metal (steel, aluminum, etc.). The problem with using metals is that they are limited in length and reach due to their heavy weight and elasticity. Typical metals used in past boom systems have had a modulus of elasticity which causes them to easily flex, at least partially resulting in the "boom bounce" discussed above. Previously, to add stiffness to the boom system, larger cross-sectional boom sections were used, adding weight to the boom system. It is problematic, therefore, to produce a boom system which has strength and stiffness as its material properties, while still being lightweight and affordable. Therefore, there is a need in the art for a system which allows for increasing the load capabilities of a conveying or hoisting boom and attached pipeline system to withstand forces applied to the systems without significantly increasing the weight of the system components.

BRIEF SUMMARY OF THE INVENTION

The present invention is a boom system comprising a first boom section having a distal end and a proximal end. A second boom section includes a distal end and aproximal end, wherein the proximal end of the second boom section is rotatably coupled to the distal end of the first boom section. At least one of the boom sections is substantially formed from composite materials.

BRIEF DESCRIPTION OF THE DRAWINGS

FIG. 3 is a top view of a boom section of the present invention.

FIG. 4 is a side view of a boom section of the present invention.

FIG. 4A is an enlarged view of the portion of area 4A in FIG. 4.

FIG. 5A in an enlarged view of the portion of area 5A in FIG. 5.

FIG. 6 is a side view of a boom section of the present invention.

FIG. 7 is a cross-sectional view of an alternate embodiment of the inventive boom section shown in FIG. 5.

FIG. 8 is a cross-sectional view of an alternate embodiment of the inventive boom section shown in FIG. 5.

FIG. 9 is an cross-sectional view of an alternate embodiment of the inventive boom section shown in FIG. 5.

FIG. 10 is a schematic view of an alternate embodiment of a boom section of the present invention.

FIGS. 12A–12F are alternate embodiments of boom cross-sectional shapes of the present invention.

FIG. 13 is a cut-away perspective view of a composite boom section of the present invention.

DETAILED DESCRIPTION

Figure 1:
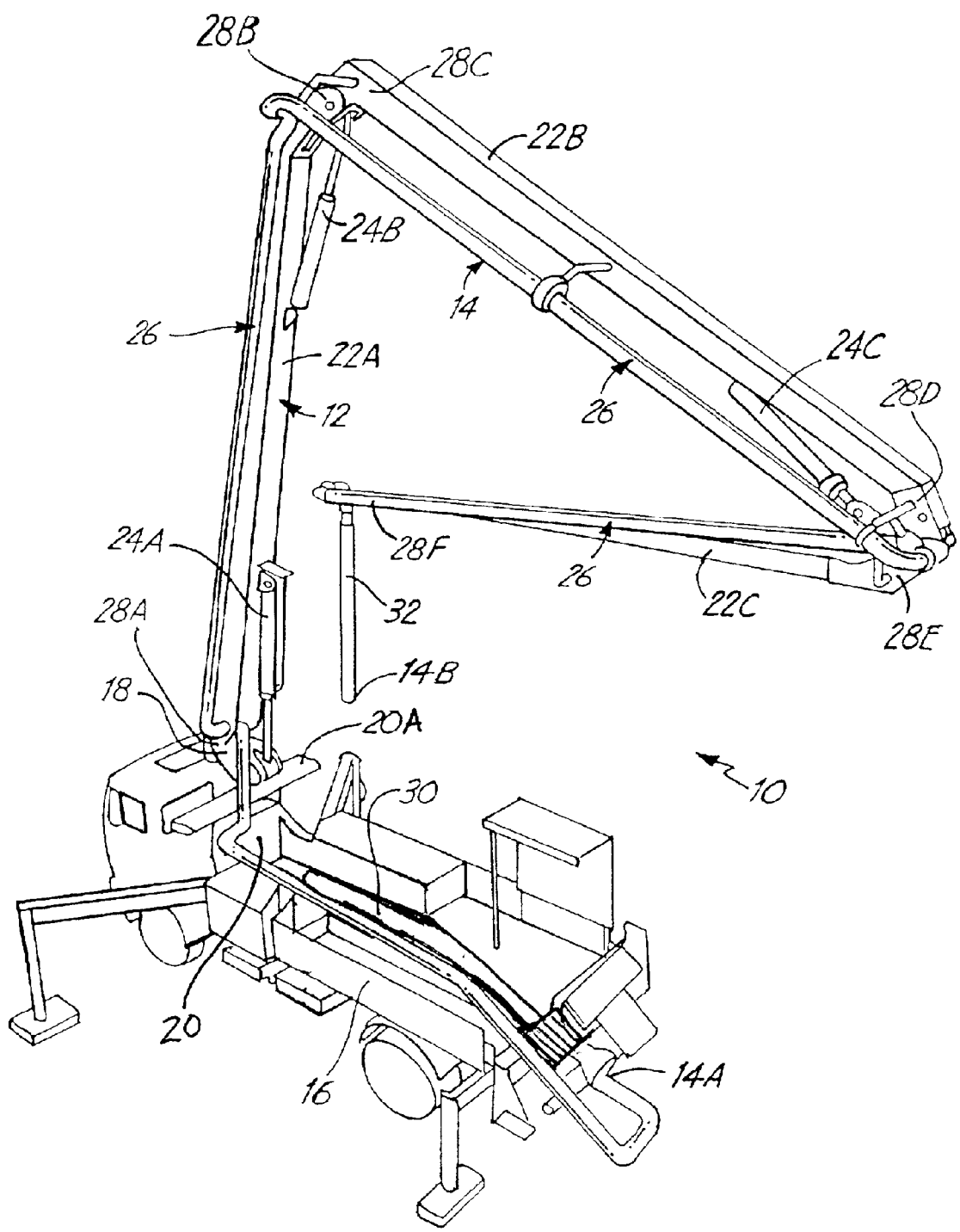
FIG. 1 is a perspective view of one embodiment of a boom system of the present invention mounted on a truck.

FIG. 1 illustrates a perspective view of a material transport system 10 of the present invention. The material transport system comprises a boom system 12 and a piping system 14 which may be mounted onto a truck 16, or other suitable support structure. The boom system 12 includes a boom support (or turret) 18, a base 20, a base boom section 22A, a middle boom section 22B, an end boom section 22C, a first actuator assembly 24A, a second actuator assembly 24B, and a third actuator assembly 24C. The boom sections 22 may be conventional steel construction or may be constructed using fiber-reinforced thermoset composite materials (discussed later). The piping system 14 includes a series of pipes 26 used for transporting flowable materials therein. The piping system 14 maybe attachable to the boom system 12 as illustrated in FIG. 1, or disposed within the boom system 12 as will be described later with respect to FIG. 2.

It should be noted that in the description of the invention embodiments, specific examples of elements such as "base boom section 22A" are referred to with a reference number that includes an appended letter, in this case the letter "A." On the other hand, when elements are referred to generally, no letter is appended (e.g., "boom sections 22") which refers to all of the like elements (e.g., boom sections 22A, 22B and 22C) in an inventive embodiment it should also be noted that in the description of the present invention, like reference numerals designate the same or corresponding parts throughout the several figures of the drawings, and terms such as "vertical", "horizontal", "top" and "bottom", and the like are used as words of convenience not to be construed as limiting terms.

The turret 18 of the boom system 12 is mounted on the base 20. The base 20 is mounted onto the truck 16 to support the boom sections 22. Mounting the boom system 12 onto the truck 16 provides a mobile platform for the boom system 12. It should also be noted that it is within the scope of the present invention to mount the boom system 12 to a variety of mobile platforms which are not illustrated, including a ship, or a train or alternatively a variety of immobile support systems. The turret 18 is rotatably connected to the base 20. A proximal end 28A of the base boom section 22A is pivotally connected to the turret 18. A distal end 28B of the base boom section 22A is pivotally connected to a proximal end 28C of the middle boom section 22B. Likewise, a distal end 28D of the middle boom section 22B is pivotally connected to a proximal end 28E of the end boom section 22C. A distal end 28F of the end boom section 22C is unfixed. Although the boom system 10 has three boom sections illustrated in FIG. 1, alternative inventive embodiments of the boom system 10 can include any number of boom sections 22.

The first actuator assembly 24A is connected to the turret 18 and to the base boom section 22A for moving the base boom section 22A relative to the turret 18. The second actuator assembly 24B is connected to the base boom section 22A and the middle boom section 22B for moving the middle boom section 22B relative to the base boom section 22A. The third actuator assembly 24C is connected to the middle boom section 22B and the end boom section 22C for moving the end boom section 22C relative to the middle boom section 22B.

In preferred embodiments, the boom system 12 is hydraulically actuated and the actuator assemblies 24 are hydraulic piston/cylinder assemblies. It should be noted, however, that the actuator assemblies 24 can be any other type of actuator assembly capable of producing mechanical energy to rotate the boom sections 22 relative to each other and to the turret 18. For example, the actuators 24 can be pneumatic, electrical, or other types of actuators known to a person skilled in the art. The actuator assemblies 24 must also have the capability to hold the boom sections 22 stationary with respect to each other and the turret 18. The actuators 24 are controlled by an operator to direct the distal end 28F of the end boom section 22C into the desired position. Typically, the turret 18 can be rotated about a vertical axis with respect to the base 20, utilizing a turret actuator 20A. Rotating the turret 18 allows the entire boom system 12 to be rotatable with respect to the base 20.

Figure 2:
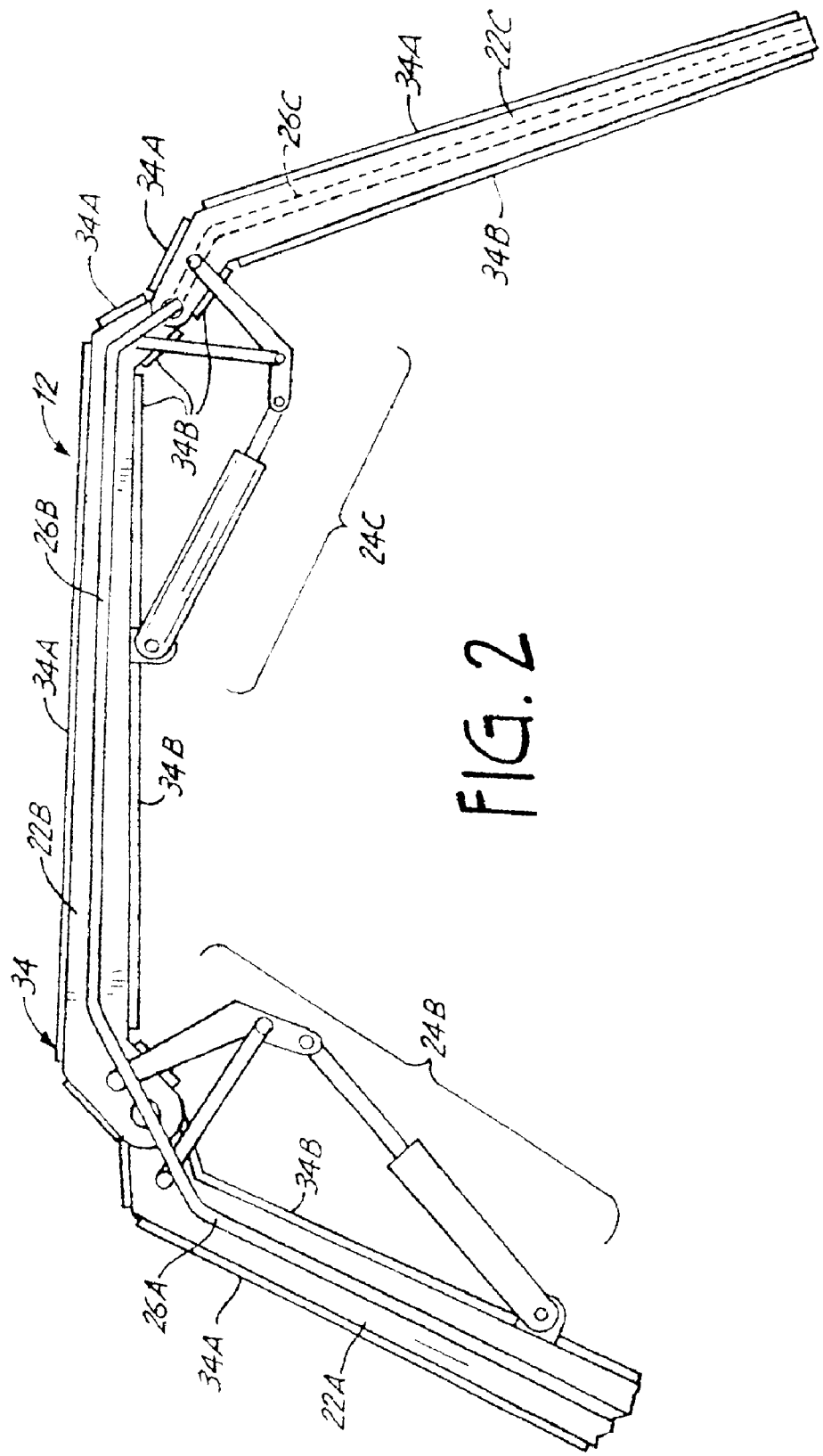
FIG. 2 is a side view of a second embodiment of a boom system of the present invention.

The embodiment of the present invention illustrated in FIGS. 1 and 2 includes the piping system (or pipeline) 14 secured to the boom system 12. The piping system 14 is used to direct material (e.g., concrete) which is forced through a series of pipes 26. Typically a piston pump 30 (although other types of pumps may be used) forces the material into an intake end 14A of the pipeline 14. The material exits the pipes 26 through a delivery end 14B, typically via a delivery hose 32. Thus, the operator can position the distal end 28F of the end boom section 22C so as to direct concrete pumped through the attached piping system 14 into the desired location (e.g., a remote concrete form). Typical capacity of the pump 30 can vary across different types of pumps. In one embodiment, the capacity can vary from as low as approximately 75 cubic yards of concrete per hour to as high as approximately 209 cubic yards of concrete per hour, with each cubic yard of concrete weighing approximately two tons.

As discussed, stresses are generated by the pumping action on the boom system 12. The principal stresses from the force of the pumping on the piping system 14 are longitudinal stresses (parallel to the longitudinal axis of the pipe 26) and hoop stresses (perpendicular to the longitudinal axis of the pipe 26). The use of a piston type pump (a pump is indicated generally at 30 in FIG. 1) to pump concrete can create substantial longitudinal stresses as well as hoop stresses in the pipeline 14. As a result, the pipeline 14 must have sufficient strength to be able to withstand line shocks which occur multiple times per minute (e.g. up to approximately 32 times per minute). In one application, the maximum working pressure of the concrete through the pipeline 14 can vary from approximately 759 lbs per square inch (p.s.i.) to approximately 1233 p.s.i., with the maximum hydraulic pressure of the pump at approximately 5075 p.s.i. The pipeline 14 must be able to withstand the forces exerted by the concrete under pressure from one end of the pipeline 14 to the other, otherwise pipe failure (i.e., rupture of the pipe) will occur. A general rule of thumb is that the burst pressure of the pipe 26 must be at approximately three times the working pressure. In one embodiment of the present invention, the piping system 14 uses pipes 26 having an inner diameter of approximately five inches.

While the piping system 14 maybe mounted to a support structure such as the truck 16, it should be understood that a portion of the piping system 14 may also extend over open ground(i.e. the pipe can be cantilevered from the outermost boom section. As illustrated in FIG. 2, portions of the piping system (as indicated by reference numbers 26A and 26B) can be conventionally mounted to the exterior of the boom sections 22, while other portion(s) (as indicated by reference number 26C) can be mounted inside one or more of the boom sections 22.

To provide strength while limiting the weight of the boom system 12 and/or the piping system 14, composite materials are used in their construction. Advanced composites or modern structural composites are terms used to describe fiber-reinforced composite materials that have high-performance characteristics, generally strength and stiffness. Description and identification of various composite materials can be found in literature such as by Mel M. Schwartz, Composite Materials, Volumes I and II, Prentice-Hall, Inc., NJ 1997, ISBN 0-13-300047-8 and ISBN 0-300039-7.

Composite materials are the result of embedding high strength, high stiffness fibers of one material in a surrounding matrix of another material. The fibers of interest for composites are typically in the form of single fibers. The fibers may alternatively be used as multiple fibers twisted together in the form of a yarn or tow. When properly produced, the fibers have very high values of strength and stiffness. Each fiber is typically orthotropic, having different properties in two different directions wherein the greater strength, stiffness and toughness of a fiber generally lies along its length. The strength and stiffness of the fibers are much greater than that of the matrix material. The fibers are embedded in or bonded to the matrix material with distinct boundaries between the fibers. In this form, both the fibers and the matrix material retain their physical and chemical identities, yet they produce a combination of properties that cannot be achieved with either of the constituents acting alone. In general, the fibers are strong and stiff compared to the matrix material, and are the principal load-carrying members. Some example types of reinforcing fibers include, but are not limited to, the following: glass, carbon (graphite), aramid, polyethylene (PE) and boron.

The matrix material holds the fibers in place in the desired orientation. The role of the matrix material in a fiber-reinforced composite material is to transfer forces (e.g., stress, or load) between the fibers and protect the fibers from mechanical abrasion and environmental degradation. The ability to resist corrosion, distribute forces, provide impact resistance, and provide vibrational dampening all influence the choice of the matrix material.

Polymeric matrices are an example of a common type of matrix material which may be used in either the boom system 12 or the piping system 14 of the present invention. A polymeric material is made of a large number of long-chain molecules of similar chemical structure frozen in space. Thermoset polymers are an example of a polymeric matrix and are traditionally used as a matrix material for fiber-reinforced composite materials. Common types of thermoset polymers include, but are not limited to, the following: epoxy, phenolic, polyesters, vinyl esters, polyimides and cyanate esters.

In thermoset polymers, the long-chain molecules are chemically joined together (cross-linked) forming a rigid, three-dimensional network structure. This process is called "curing" and is often initiated by a catalyst or accelerator in the resin system which allows the curing to take place at room temperature. An alternative curing method uses the application of external heat to initiate the cross-linking process.

A common form in which fiber-reinforced composites are used in structural applications is called a laminate. Laminates are obtained by stacking a number of thin layers of fibers in a matrix to achieve the desired thickness. Fiber orientation in each layer, as well as the stacking sequence of various layers, can be controlled to generate the desired physical and mechanical properties for the laminate. When the fiber layer and the matrix layer are joined to form a laminate, each layer retains its individual identity and influences the laminate's final properties. The resulting laminate composite consists of layers of fibers and matrix material stacked in such a way as to achieve the desired properties in the desired direction. The ordering of the fiber layer and the matrix layer may be changed without drastically altering the properties of the composite material laminate as a whole. The number, composition and orientation of fibers in the layers vary amongst composite laminate materials. Thus, through the use of composite materials, the boom system 12 and/or the piping system 14 can be formed to strengthen each system 12 and 14 at positions that experience higher stress and strain, which would minimize the amount of strengthening material needed.

While previously the boom sections 22 could only be strengthened by increasing the thickness of the metal of which they were formed, the boom system 12 of the present invention incorporates a much smaller amount of composite material, which can be used to achieve the same strengthening effect. Additionally, the composite material is lighter than the same amount of metal (e.g., steel). Therefore, constructing the boom sections 22 either partially or entirely from composites provides a stronger and lighter boom system 12. The composite fiber matrix on the metal boom section 22 stiffens the boom system 12 while adding a proportionately small amount of weight to the boom system 12.

Numerous advantages can be realized by decreasing the weight of each boom section 22. One advantage is that the hydraulic power requirements to operate the actuators can be reduced. Additionally, as each boom section 22 is reduced in weight, the weight of the entire boom system 12 is reduced. Reduction of the dead weight of the boom allows reduction of the weight of other boom components, including but not limited to, hydraulic cylinders, guide levers, pins, etc. Weight reductions of the entire boom system will allow lighter weight support systems that are mounted on the truck chassis, (e.g. the turret 18, base 20, and any required outriggers). Any truck system weight which previously was utilized strictly as ballast can also be reduced or eliminated. The reduction of the boom system 12 weight allows more flexibility in use of the truck 16. An important factor on truck-mounted boom systems is the level of axle loading permitted on various roads. Reducing the weight of the truck can permit the operator to retract (or eliminate) the "pusher" or "tag" axles which were previously used to comply with the restrictions for traveling on certain roads. Additionally, the size of the truck itself may be reduced. Reducing the size of the truck 16 results in large cost savings when building the material transport system 10 of the present invention. A smaller truck 16 also allows for more maneuverability, allowing the truck 16 to position the boom system 12 in more inaccessible areas than would be possible for a larger truck.

Alternatively, modifying an existing boom system 12 allows the boom system 12 to accommodate a larger load, or extend the reach of the boom system 12 while only minimally increasing its weight. Along these same lines, boom systems 12 with longer boom sections 22 can be used to extend the reach of the boom system 12.

The use of composites either in the form of purely composite boom sections 22, as illustrated in FIG. 1 or as stiffening layers 34 on metal boom sections 22, as illustrated in FIG. 2 allows the manufacturer to customize the strength of the boom system 12. The boom system 12 can be strengthened to carry more weight, to reach further, to resist impact forces, to resist impulse forces such as those caused by pumping forces, or to withstand forces acting transversely on the boom sections 22. Additionally, existing boom systems 12 can be strengthened by retrofitting stiffening layers 34 onto the boom sections 22 providing an economical upgrade to systems already manufactured. All these objectives can be accomplished while maintaining the material transport system 10 at a weight which allows ease of transportation.

FIGS. 3 and 4 illustrate an exemplary embodiment of one boom section 22 using composite materials as stiffening layers 34 in concert with pre-existing styles of boom construction while end boom section 22C is specifically shown, it should be understood that the discussion with respect to end boom section 22C is meant to be exemplary for any or all boom sections 22 and in the inventive boom system (illustrated previously in FIGS. 1 and 2). The boom section 22 includes top and bottom composite stiffening layers 34A and 34B. The longitudinal axis of the boom section 22 is designated by reference number 36. The stiffening layers 34A and 34B run substantially parallel to the longitudinal axis 36 (preferably within ten degrees of parallel). The boom section 22 further includes a foot section (or coupling arm) 38, and a boom arm 40. The foot section 38 functions to rotatably couple adjacent boom sections 22 to one another, or to couple boom section 22A to the turret 18 (as shown and described previously with respect to FIG. 1). The boom arm 40 is made of steel or other metal and is fixed to the foot section 38 (also made of steel, aluminum or other metal), typically by welding. While the inventive embodiment is described using metal boom arms 40, the invention can also be used to strengthen boom sections 22 made of other materials, including composite boom sections (discussed further below).

As illustrated in FIG. 4A, the top and bottom composite stiffening layers 34A and 34B can be applied to the foot section portion 38 of the boom section 16 as well as to the boom arm portion 40.

Figure 5:
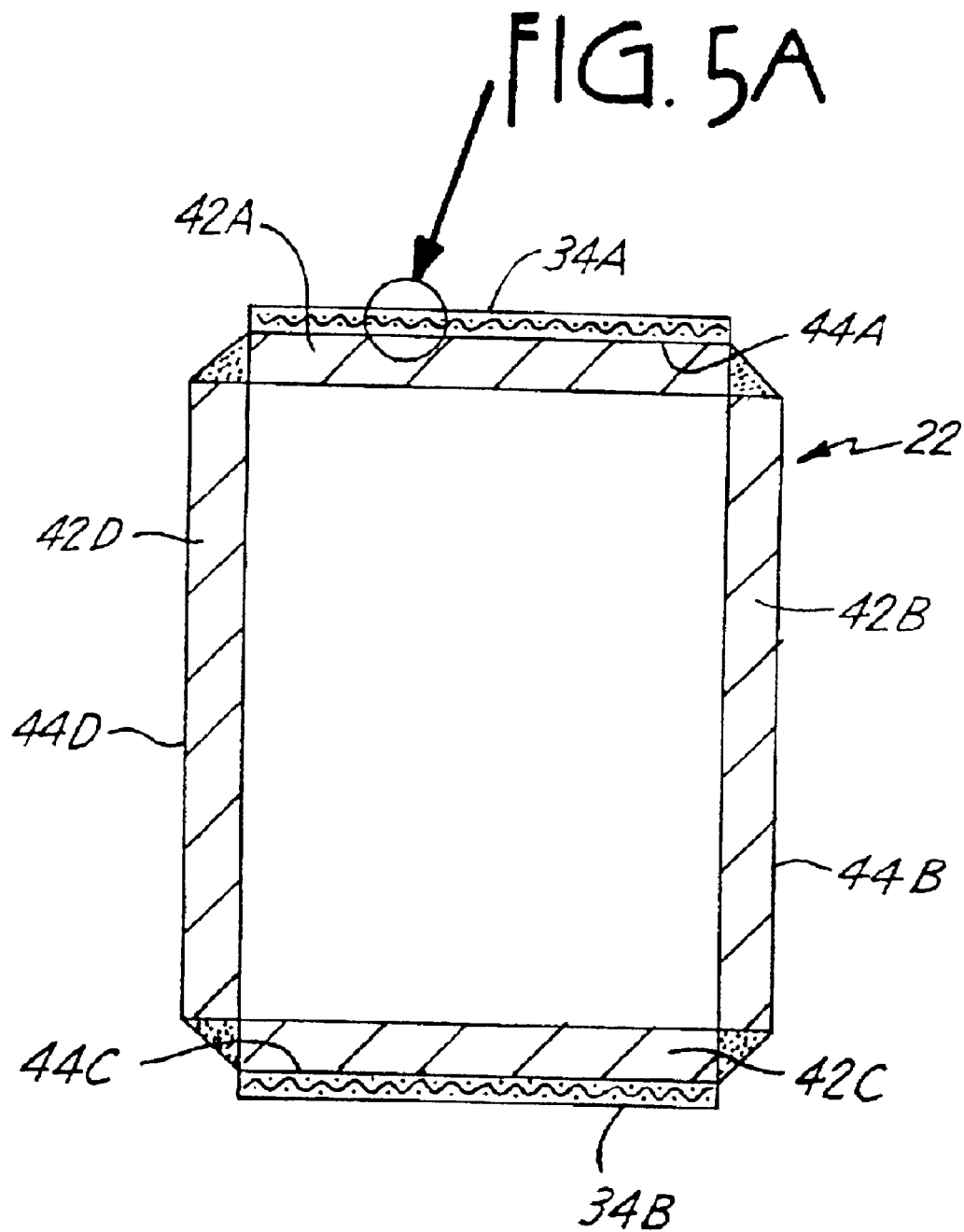
FIG. 5 is a cross-sectional view of a boom section of the present invention

The metal boom sections 22 are constructed according to a variety of methods generally known to those skilled in the art. Typically, the boom sections 22 are constructed by welding four steel plates 42A, 42B, 42C, and 42D together, as is illustrated by the cross-sectional view of boom section 22 in FIG. 5. In the illustrated embodiment, the four steel plates 42A–42D form a hollow structure having a rectangular cross section, although other cross-sectional shapes and materials are contemplated by the invention. Each steel plate 42A–42D has an exterior face 44A, 44B, 44C, and 44D, respectively. The top and bottom stiffening layers 34A and 34B are bonded to exterior faces 44A and 44C of steel plates 42A and 42C. The stiffening layers 34A and 34B are preferably bonded to the top steel plate 42A and bottom steel plate 42C, since these are typically the plates which experience the greatest tensile and compression forces due to vertical loadings. Thus, by stiffening and strengthening plates 42A and 42C, the stress is reduced on the plates and the deflection resistance of the boom section is improved. Other configurations are possible, however, including placing stiffening layers on the exterior faces 44A–44D of all the steel plates 42A–42D. Although the boom section 22 is shown using four plates 42 welded together, other configurations may be used for the boom section 22 (e.g., I-beam, triangular, etc.) without departing from the spirit and scope of the invention. The stiffening layers 34A and 34B are preferably formed of a reinforcing composite which includes a matrix material and high tensile modulus fibers. In one embodiment, the reinforcement fiber is a uni-directional high modulus fiber indicated at 46 in FIG. 5A. The fibers 46 can be purchased for use in a variety of forms, including prepreg (fibers pre-impregnated with a thin layer of resin) or preform (fibers in woven form). In one embodiment of the invention, the fiber 46 is used in prepreg form and is positioned within a matrix material (or resin) 48 so that the length of the fiber 46 runs generally parallel to the longitudinal axis of the boom section 22, typically forming an angle less than 20° with the longitudinal axis. Using other angles, however, does not depart from the spirit and scope of the invention.

In alternative embodiments of the present invention, laminated composite materials may be used as stiffening layers 34. In this configuration, different laminate layers are positioned so that the fibers 46 in one layer run at a first angle to the longitudinal direction 36 of the boom section 22 and the fibers 46 in a second layer run at a second angle to the longitudinal direction of the boom section 22. Preferably, the fibers 46 have a tensile strength of greater than about 390 Ksi (thousand lbs per square inch) and a tensile modulus of greater than about 92 Msi (million lbs per square inch).

The fibers 46 have high compressive and tensile material properties (when used in composite materials) in the longitudinal (or lengthwise) direction. The direction in which the fibers 46 are run in the stiffening layers 34 can affect the type of force which can be withstood. For example, running the fibers 46 transversely allows the boom section 22 to better withstand shear forces. Thus, depending upon the desired application of the boom section 22, various fiber 46 directions can be used to provide customized strength, as will be further discussed with respect to FIG. 10.

In one embodiment of the present invention, the resin (matrix) 48 is a thermosetting resin, such as a polyester or epoxy resin, which is catalyzed and accelerated by adding chemicals or by applying heat. Alternatively, the resin used may be a vinyl ester. Using vinyl ester as the resin allows application and curing of the resin at ambient conditions.

As illustrated in FIG. 6, when a downward force P is applied to the boom section 22, a moment M (as is known to those skilled in the art) is generated along the length of the boom section 22, proportional to the distance from the force P (i.e., moment=force×distance). The result is that compressive forces 50 act along the bottom plate 42C of the boom section 22 and tensile forces 52 act along the top plate 42A of the boom section 22. By running the composite fibers 46 in the longitudinal direction of the boom section 16 they are disposed so that the tensile and compressive mechanical properties are oriented in the direction of the compressive forces 50 and the tensile forces 52, acting to counter the flexing of the boom section 22. It should be noted that the described placement of the force P and resulting moment M is illustrative and other forces may occur which act along the plates 42 of the boom section 22.

To illustrate the effect of the stiffening layers 34A and 34B on the boom section 22, a simplified model of the deflection of a cantilevered beam with a force applied at one end can be created by using the equation:

$$Y = \frac{PL^3}{3EI}$$

where:
Y is the distance the beam is deflected;
P is the load applied;
L is the length of the beam;
E is the modulus of elasticity (or the tensile modulus or Young's Modulus); and
I is the moment of inertia of the cross section of the beam.

The product E multiplied by I (or EI value) is known as the flexural rigidity (or stiffness). Increasing the EI value has the effect of decreasing the amount of deflection of the beam for a specific load(s). One method of increasing the EI value of a beam is to increase the "I" value of the beam. To do this, the cross-sectional dimensions (size) of the beam must be increased. Increasing the cross-section of the beam (formed from the same material, e.g., steel) results in an increase in the weight of the beam. The second method of increasing the EI value is by forming the beam from a material having a larger modulus of elasticity (E). Evaluating the effect of the stiffening layer 34 can be accomplished by comparing the EI value of a first steel beam with no stiffening layer to the stiffness of a second smaller (and lighter) steel beam utilizing the composite stiffening layer.

Consequently, the stiffness (or EI) value of the first beam can be obtained due to a large moment of inertia (I) value. The same stiffness value can be obtained in the second beam, however, using a smaller moment of inertia by manufacturing the second beam using a material which has a larger modulus of elasticity than the material of the first beam.

The following example illustrates the effect of adding a composite layer to the boom system 12. The steel plates 42A–42D in the boom section typically have a modulus of elasticity of approximately 29 msi. The material property numbers chosen for the stiffening layers 34 are exemplary only, (e.g., thickness, elasticity). Other property values may be chosen according to the desired application. For this example, the stiffening layers 34A and 34B have a modulus of elasticity of approximately 54 msi. The stiffening layers 34A and 34B have a thickness of approximately 0.100 inches on the top plate 42A and the bottom plate 42C. Thus, using the stiffening layers 34A and 34B greatly reduces the size of the boom section 22 (as indicated by the size of its moment of inertia (I)) while still maintaining the same stiffness (EI). This is shown by the following equation:

$$EI_{Unstiffened\ Steel\ Beam\ (USB)} = EI_{Stiffened\ Beam\ (SB)} + EI_{Composite\ Stiffening\ Layer\ (CSL)}$$

$$E_{USB} = E_{SB} = 29 \text{ msi}$$

$$E_{CSL} = 54 \text{ msi}$$

$$I_{USB} = 71.96 \text{ in}^4$$

$I_{CSL}$ for a composite layer 0.100 inch thick=14.91 in$^4$

Solve for $I_{SB}$ (71.96 in$^4$)(29 msi)=($I_{SB}$)(29 msi)+(14.91 in$^4$)(54 msi)$I_{SB}$=44.20 in$^4$ Thus, the use of the stiffening layer 34 (having a thickness of 0.100 inches) decreases the moment of inertia required of the steel beam from 71.96 in$^4$ to 44.20 in$^4$ while still maintaining the same level of stiffness. The formula for the moment of inertia of the beam, about an axis parallel to the centroidal axis of the beam is:

$$I = \Sigma 1/12 bh^3 + Ad^2$$

where:
b=the base dimension of each plate 42A–42D in the cross section
h=the height dimension of each plate 42A–42D in the cross section of the beam
A=the area of the cross section of each plate 42A–42D
d=the distance between the beam centroidal axis and the parallel axis about which rotation occurs.

It can be seen from the above equation that the dimensions of the steel beam can be reduced if the I value is reduced. It follows that using the composite material in addition to an existing steel beam strengthens the beam, whereas redesigning the beam to incorporate composites while maintaining the same levels of strength and flexibility allows a decrease in the amount of steel used in the beam. Since the composites are stronger and lighter than steel (roughly three times lighter and two times stronger) the entire beam can be much lighter, while maintaining its strength.

Affixing the stiffening layers 34 to the boom sections 22 creates the ability to manufacture larger and longer boom sections 22 by maintaining a required level of stiffness without drastically increasing the weight of the boom system 12. Additionally, by adding stiffening layers 34 to an existing boom system 12 (i.e., retrofitting the system) the capacity of an already existing boom system 12 can be increased.

FIG. 7 illustrates an embodiment of the present invention wherein the top and bottom stiffening layers 34A and 34B are applied "wet" to the boom section 22. When using the "wet" application method, the top and bottom stiffening layers 34A and 34B are formed directly on the exterior faces 44A and 44C of the top and bottom steel plates 42A and 42C. Fibers are positioned in place on the boom section 22 and resin is applied. When the resin is cured (in a manner known in the art), it bonds to the exterior faces 44A and 44C of the top and bottom plates 42A and 42C, fixing the stiffening layers 34A and 34B in place. Additional layers 34 can be positioned and cured such that the fibers are disposed any orientation in order to achieve desired strengthening characteristics.

FIG. 8 illustrates an alternative embodiment of the present invention wherein prefabricated (pultruded, extruded, cast, etc.) top and bottom stiffening layers 34A and 34B are affixed to the exterior faces 44A and 44C of the top and bottom steel plates 42A and 42C of the boom section 22 using an adhesive 54. This manner of fixation allows an existing boom system 12 to be upgraded using the extruded composite stiffening layers 34A and 34B, which are formed separately from the boom section 22. They can then be applied to the boom system 12 (either at a manufacturing facility or transported to a work site) and affixed to the boom section 12. This method of affixing the stiffening layers 34A and 34B provides a convenient method to upgrade the strength of a previously manufactured boom system 12. The adhesive 54 used is preferably epoxy (although other adhesives may be used). The adhesive 54 is applied to the outer surfaces 44A and 44C. The stiffening layers 34A and 34B are then pressed onto the adhesive 54, and the adhesive is allowed to cure. Thus, each of the stiffening layers 34A and 34B is secured to each boom section 22.

The stiffening layers 34A and 34B may alternatively be mounted to the boom system 12 using mechanical fasteners, as illustrated in FIG. 9. Bolts 56 (or other fasteners known in the art such as rivets, screws, etc.) are disposed through apertures 58 in the stiffening layers 34 and top and bottom steel plates 42A and 42C. Alternatively, fasteners may be screwed through the stiffening layers 34A and 34B (using, for example, self tapping screws). Once again, this fixation method allows the extruded stiffening layers 34A and 34B to be affixed to the boom section 22 and can be used to easily retro-fit pre-existing boom systems 12 with stiffening layers 34. Although only four bolts 56 are shown in FIG. 9, additional fasteners would typically be used to secure the stiffening layers 34A and 34B to the boom section 22.

In various embodiments, the thickness of the composite layer 34 may be increased to increase the stiffness of the boom sections 22. Additionally, stiffening layers 34C, 34D, 34E and 34F can be secured to each of the steel plates 42A–42D of the boom section 22, as illustrated schematically in FIG. 10. Once again, the placement of the stiffening layers 34 and the direction of fibers 46 within each stiffening layer 34 determines the direction upon which strength is provided to the boom section 22. If a layer having generally longitudinal fibers 46A is mounted to the top plate 42A (as shown by the composite stiffening layer 34C), the boom section 22 is able to better withstand applied forces which bend the boom section 22 about a horizontal axis 60 (such as by loads attached to the boom system 12, or by the weight of the boom sections 22 themselves). If a layer having generally longitudinal fibers 46B is mounted to the side plate 42B (as shown by the composite stiffening layer 34D), the boom section 22 is better able to withstand forces which bend the boom section 22 about a vertical axis 62 (such as may occur when the boom section contacts an external object). Additionally, the direction which the fibers 46 are run in the stiffening layers 34 can affect the type of force which can be withstood. For example, a layer having fibers 46C running transversely mounted to side plate 42D, (as shown by composite stiffening layer 34F) allows the boom section 22 to better withstand shear forces. Thus, depending upon the type of application the boom section 22 is used in, various fiber 46 directions can be used to provide customized strength.

Figure 11:
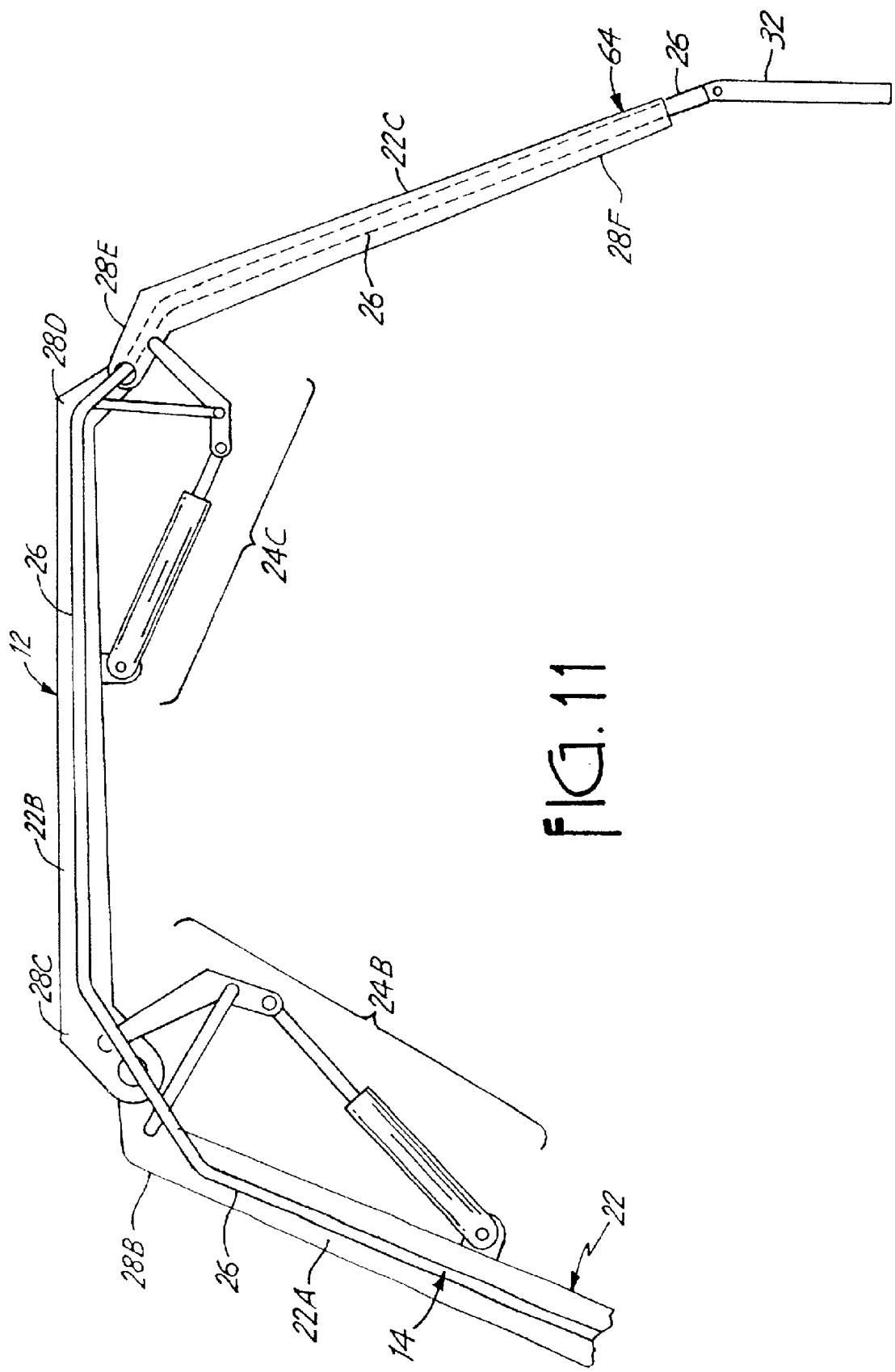
FIG. 11 is a side view of an alternate embodiment of a composite boom system of the present invention.

In addition or in the alternative to stiffening layers 34, composite material may be used to construct the boom section 22 itself. An alternate embodiment of a composite boom system 12 is illustrated in FIG. 11. In this embodiment, at least one and alternatively all of the boom sections 22 are constructed substantially of thermoset composite materials. Similar to the use of stiffening layers 34, the use of lightweight composites to form each boom section 22 has multiple advantages (e.g., increased truck stability, etc.). Since each of the entire boom sections 22 are formed of composite materials, the weight of the entire boom system 12 can be dramatically reduced compared to prior art boom systems. The lightweight composite boom system 12 of the present invention has a smaller hydraulic power requirement than a steel composite boom system having similar strength. By reducing the weight of the boom system 12, components used in conjunction with the boom system 12, such as hydraulic cylinders, guide levers, pins, etc, can be reduced in weight as well, because the stresses imposed by the boom system 12 are reduced. Additionally, truck weight and axle weight can also be reduced, thereby reducing road restrictions applicable to the vehicle used to support the boom system 12.

Lightweight composite boom sections 22 may be used to extend the vertical and/or horizontal reach of conveying boom systems 12 past that of prior art metal boom systems utilizing similarly sized steel boom sections 22. The boom system 12 is cantilevered, so that each intervening boom section 22 (e.g., middle boom section 22B) supports the weight of the more distal boom sections (e.g., middle boom section 22B supports the end boom section 22C, and base boom section 22A supports the combined loads of middle and end boom sections 22B and 22C). Constructing the boom sections 22 substantially of lightweight composites, reduces the weight added to the total load of the boom system 12 by each of the boom sections 22 and allows the boom system 12 to be built with a greater vertical and/or horizontal reach.

As was described with respect to utilizing stiffening layers 34, composites can be used in one, some or all of the boom sections 22. Not using composites in all the boom sections 22 provides combinations of steel boom sections and composite boom sections which can reduce the overall costs when compared to constructing an entire boom system 12 of composite materials, while still attaining benefits from the use of the composite materials. An advantageous boom system embodiment that balances utility with costs constructs the outermost boom section (in the illustrated embodiment, end boom section 22C) using fiber-reinforced thermoset composite materials, while constructing the remaining boom sections 22 of steel. This "hybrid" embodiment of the boom system provides stability to the boom system 12 by decreasing the weight of the distal end 64 of the boom system 12. The overall reduction in weight of the boom system 12 decreases the overturning moment when the boom system 12 is extended, thereby increasing stability. Thus, utilizing a combination of steel boom sections with composite boom sections generates a large increase in performance by the boom system 12 with minimal increase in expense which maybe incurred by utilizing composite materials.

Any combination of metal boom sections 22 in combination with composite boom sections 22 is contemplated by the invention. For example, the second and third boom sections 22B and 22C maybe made of composite materials, while the first boom section 22A is metal. Additionally, any number of boom sections may be utilized in the boom system 12 of the present invention. Also, any combination of composite boom sections to composite stiffened metal boom sections may be used without departing from the spirit and scope of the invention.

As discussed above, an advantage of composite materials is the ability to choose materials and forming techniques so as to achieve the desired qualities for the boom sections 22. Fiber-reinforced composite materials consist of fibers with high strength and modulus embedded in a matrix. When the fiber and matrix are joined together, they both retain their individual characteristics and both influence the composite material's final properties directly.

When designing entire boom sections 22 of composite materials, properties of interest include, but are not limited to the following: tensile strength, stiffness, vibrational dampening, impact resistance, corrosion resistance and weight reduction (versus steel booms). Inherent vibrational dampening is one benefit of fiber-reinforced composite materials over conventional steel-type boom sections.

Boom sections 22 may be constructed of composite materials according to a variety of methods generally known to those skilled in the art. In one embodiment each boom section 22 has a long rectangular shape with a slight taper resulting in a smaller circumference at the distal end 28B of each boom section 22 than at the proximal end 28A. FIGS. 12A–12F illustrate alternative embodiments of boom sections 22 having varying cross-sectional shapes. Possible cross-sectional shapes for individual composite boom sections 22 include, but are not limited to, rectangular 66 as illustrated in FIG. 12A, ovular 68 as illustrated in FIG. 12B, circular 70 as illustrated in FIG. 12C, elliptical 72 as illustrated in FIG. 12D, hexagonal 74 as illustrated in FIG. 12E and radiused rectangular 76 as illustrated in FIG. 12F. These shapes are exemplary of cross-sectional shapes which could be used for each boom section 22, and many additional shapes may be utilized without departing from the spirit and scope of the invention.

As illustrated in FIG. 13, the shape of each boom section 22 is controlled by the shape of a mandrel 78 that is used in boom construction. The mandrel 78 is usually a hollow steel mandrel with a slight taper. Any suitable form may be used, however, including solid forms or forms made of materials such as aluminum or balsa. Additionally, additional pieces of material can be attached to an existing mandrel 78 to alter the shape of the mandrel. For example, to create the radiused rectangular shape 76 of the boom section 22 illustrated in FIG. 13, two internal sandwich blockouts 80 are attached on the narrow sides of the steel mandrel 78. In one embodiment, the outer dimensions of the steel mandrel 78 are approximately 4 inches by approximately 6.5 inches. Additionally, the blockouts 80 have a radius of approximately 2.39 inches and are attached to the mandrel 78. Attaching the blockouts 80 to the mandrel 78 creates a form 82. The outside of the form 82 is coated with a layer of wax 84 (preferably approximately 1/16 inch thick) to aid in the removal of the form 82 after forming the composite boom section 22.

In one embodiment, constructing the composite material boom section 22 entails applying several layers (or lamina) composed of fibers embedded in a resinous or polymeric matrix over the form. The end result is boom section 22 formed from a unified composite material laminate. Typically, individual fibers are too small to work with, so they are bundled into strands, which are grouped and wound onto a cylindrical forming package called a roving. The rovings are used in continuous molding operations such as filament winding. The fibers can be pre-impregnated with a thin layer of the polymeric resin matrix or applied wet where the fiber is coated with the resin solution just before application. The volume distribution between the two components is approximately 60% fiber, and approximately 40% resin.

One method to apply composite layers is by using the process of filament winding. The fiber (from a roving) is fed from a horizontally translating delivery head (not shown) to the rotating wax-coated form 82. The angle of the fiber with respect to the longitudinal axis of the form is called the wind angle. The angle is typically varied from approximately 20° to approximately 90°. The properties of the boom section 22 depend strongly on the wind angle of the fibers. A feed carriage (not shown) moves backward and forward causing the fibers to crisscross at plus and minus the wind angle, creating a weaving or interlocking pattern. After winding, the composite is cured by methods dictated by the resin composition chosen.

One embodiment in particular is illustrated in FIG. 13. A first layer of composite material 86 is applied over the wax-coated form by utilizing glass fibers 86A embedded in a vinyl ester matrix 86B. S-2 glass fibers are chosen for their high tensile strength of approximately 4.30 (Giga Pascals) GPa. S-2 glass fiber is one of several kinds of glass fiber, and is a lower cost version of S-glass. Other glass fibers such as S-glass or other fibers such as aramid that have similar tensile strength could be substituted for the S-2 glass and achieve the desired final properties. The glass fibers 86A are applied wet, coated with VE 8084, a vinyl ester resin, utilizing the filament winding process described above. A preferable embodiment has a wind angle of 20°, although the angle could be varied within a narrow range and achieve similar final properties. The first layer 86 is then cured by maintaining the first layer 86 at room temperature for approximately two hours (or in a manner known to those skilled in the art). Preferably, the resulting S-2 glass/VE8084 layer 86 is approximately 0.14 inches thick after curing.

A second composite material layer 88 is comprised of carbon fibers 88A embedded in an epoxy resin 88B. Typically, the second composite layer 88 is applied over the first composite layer 86 using a film adhesive layer to hold the carbon fibers in place until the epoxy is applied and cured, but alternative applications of the layers are within the scope of the present invention. The carbon fibers in the second composite layer 88 are used to provide stiffness to the boom section 22 because of their very high tensile modulus. Fibers with a tensile modulus of approximately 91 Msi are used in a preferred embodiment.

The carbon fibers 88A of the second composite layer 88 are wound onto the form using a process called polar winding. The fibers 88A are wound about the longitudinal axis of the form 82. The fiber bands preferably lie adjacent to each other and there are no crossovers. In one embodiment, the carbon fibers 88A are hand-laid at approximately a 0° wind angle on the radiused ends only. The epoxy resin is then brushed or sprayed onto the fibers. Preferably, the resulting second composite layer 88 is approximately 0.05 inches thick after curing. Additional carbon fiber layers may be used to increase the stiffness and strength of the boom as is desired.

A flex core layer 90 of aluminum is applied over the second composite layer 88. The flex core layer 90 acts as a shock absorber or toughness enhancer to protect the first composite material layer 86 and the second composite material layer 88 from any impact on the boom which could damage the integrity of these layers. Typically, the flex core layer 90 has an accordian or a honeycomb configuration through its thickness which allows the flex core layer 90 to absorb the impact by compressing (or being "crushed"). In one embodiment, the flex core layer 90 has a crush strength of approximately 500 psi. In other words, the flex core layer 90 can dissipate the energy of an impact up to 500 psi. The flex core 90 preferably has a density of approximately 5.1 lb/ft$^3$ inches and a thickness of approximately 0.5 inches.

A third composite material layer 92 is applied over the aluminum flex core 90 to provide impact resistance. The third layer 92 comprises aramid fibers 92A embedded in a vinyl ester (VE8084) resin matrix 92B. Aramid fibers have high tensile strength to weight ratios and are resistant to impact damage. In the preferred embodiment the aramid fiber 92A is helically wound in a manner similar to the first layer 86. A preferred embodiment has a wind angle of approximately 30°, although the angle could be varied. The resulting third composite layer 86 has a preferable thickness of approximately 0.083 inches after curing for approximately two hours at room temperature.

A fourth composite material layer 94 is an additional S-2 glass/VE 8084 layer including glass fibers 94A coated in epoxy resin 94B. The purpose of the fourth composite layer 94 is to add additional strength and impact resistance. The fourth layer 94 is helically wound in a manner similar to the first composite layer 86, but at a wind angle of approximately 60° (other wind angles may be used), preferably having a thickness of approximately 0.030 inches.

After layers 86, 88, 90, 92 and 94 are disposed about the form 82 and the layer of wax 84, form 82 is removed, leaving the completed (hollow) composite boom section 22. This maybe accomplished by heating the completed boom section 22 in order to soften the wax 84, allowing the form to slide longitudinally out from inside the layers 86, 88, 90, 92 and 94.

The composite boom section 22 formed in the above-described manner has approximately the same stiffness as a comparable steel beam with approximately half of the weight. The EI value (stiffness) of a steel boom section 22 is approximately 786×10$^6$ lb.$^2$ft.s$^2$/in$^2$ with an approximate weight of 0.849 lbs/in., whereas the composite boom section 22 has a calculated EI value of approximately 759×10$^6$ lb.$^2$ft.s$^2$/in$^2$ with an approximate weight of 0.447 lbs/in. As discussed previously, lighter weight boom systems 12 are beneficial because of the reduction in boom bounce and ability to more easily transport the boom systems 22. Composite boom systems 12 are especially useful when the boom structures 22 are utilized for the conveyance of concrete, slurries, grout and industrial or waste material. These materials are often dense and abrasive, requiring heavy pipe 26 to withstand the materials themselves and the pressure from the pumps to flow the material. The boom system 12 must be able to support both the heavy pipe 26, the concrete at 150 lbs per cubic foot, and the extended boom sections 22. The composite boom sections 22 of the present invention and the overall boom system 12 are much lighter than conventional steel boom systems of the prior art, while still maintaining similar superior strength and stiffness characteristics.

Figure 14:
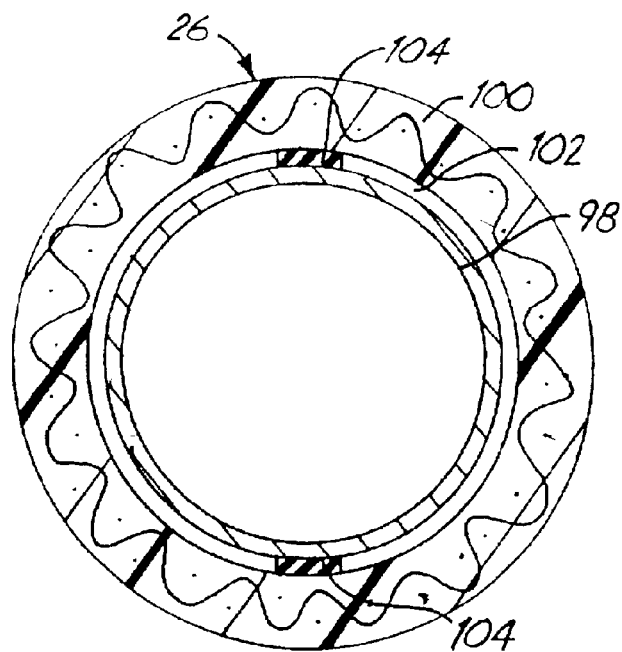
FIG. 14 is a cross-sectional view of an embodiment of an inventive composite pipe section of the present invention.

To further reduce the weight of the material transport system 10, at least some of the piping system 14 may be constructed of composite materials, as illustrated in FIG. 14. As with the boom sections 22, an advantage of composite materials used in constructing the pipes 26 is the ability to select materials that achieve the desired qualities for a particular application while markedly reducing the weight of the material transport system 10. When designing the pipes 26 for use with the boom system 12, properties of interest include, but are not limited to, the following: tensile strength to resist hoop and longitudinal stresses, vibrational dampening, impact resistance, abrasion resistance and thermal expansion.

When forming the composite pipe sections 12, the composite materials are usually arranged in layers (as was discussed with respect to the composite boom sections 22 in FIG. 13). These layers adhere together during curing to form a unified laminate. The fibers in each layer are oriented in such a way as to achieve the desired properties in one or more directions. The ordering of the layers maybe changed to alter the properties of the composite material laminate as a whole. The number, composition and orientation of fibers in the layers may vary amongst composite laminate materials according to the desired properties of the final cured (or hardened) material.

Each composite pipe 26, as illustrated in FIGS. 14 through 18, may be constructed according to a variety of methods generally known to those skilled in the art. In one embodiment, pipe sections 26 are constructed using fiber-reinforced, thermoset composite materials. Forming the composite pipes 26 of the piping system 14 can be accomplished in substantially the same manner as was described with respect to the boom sections 22 formed of composite materials. Individual fibers are bundled into strands, which are grouped and wound onto a roving. The rovings are used in continuous molding operations such as filament winding and are pre-impregnated with a thin layer of polymeric resin matrix (prepreg) or applied wet where the fiber is coated with the resin solution just before application. Again, the preferred volume distribution between the two components is approximately 60% fiber and approximately 40% resin. During filament winding, the fiber is fed from a horizontally translating delivery head to a rotating wax-coated mandrel. The wind angle can be varied from 20° to 90°. Most preferably, the wind angle is at 54° to the longitudinal axis of the mandrel, providing balanced strength to the piping 26 in both the longitudinal and transverse directions. After winding, the composite material is cured by methods dictated by the resin composition chosen.

FIG. 14 illustrates one embodiment of the pipe section 26 using a liner 98 made of abrasive resistant materials inserted inside a pressure tube 100 made of fiber-reinforced thermoset composite materials. An annular space 102 is disposed between the liner 98 and the pressure tube 100. The liner 98 may be made of aluminum, steel or fiber-reinforced thermoset composite materials chosen to withstand abrasion. The pressure tube 100 is preferably constructed of layers of fiber-reinforced thermoset composite materials chosen to provide strength to withstand hoop and longitudinal stresses on the pipe 26. The annular space 102 between the liner 98 and the pressure tube 100 allows the liner 98 to be removed and replaced as it becomes worn by contact with the concrete or other abrasive materials. Alternatively, the liner 98 may be maintained in the pressure tube 100 using stops 104 glued or bolted into the pressure tube 100. Compressible stops 104(such as rubber stops) are preferably used to accommodate differential thermal expansion of the pressure tube 100 and liner 98.

Figure 15:
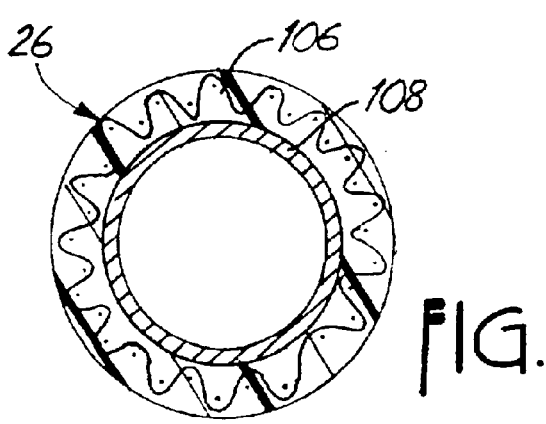
FIG. 15 is a cross-sectional view of an alternative embodiment of an inventive composite pipe section of the present invention.

FIG. 15 illustrates an alternative embodiment of composite pipe section 26. An outer composite pressure tube 106 may be applied directly over a metal liner tube 108. In one embodiment, The composite pressure tube 106 preferably has an outer diameter of approximately 5.625 inches and an inner diameter of approximately 5.25 inches. In one embodiment, the liner tube 108 preferably has an outer diameter of approximately 5.25 inches and an inner diameter of approximately 4.88 inches.

Figure 16:
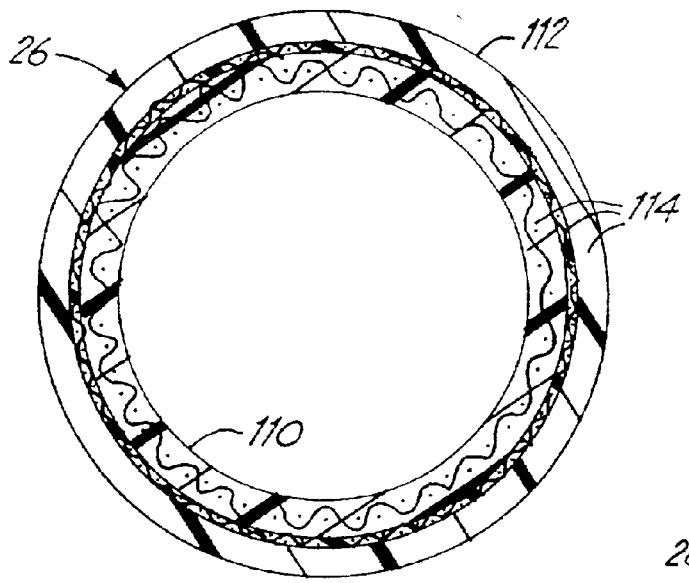
FIG. 16 is a cross-sectional view of an alternative embodiment of an inventive composite pipe section of the present invention.

FIG. 16 illustrates another alternative embodiment of composite pipe section 26 wherein the pipe section 26 is composed of only fiber-reinforced thermoset composite materials. The composite materials are chosen so that an inner surface 110 of the pipe 26 is resistant to abrasive materials (e.g. concrete). An outer surface 112 is formed of a fiber-reinforced thermoset material chosen for its impact resistant qualities. Positioned between the inner surface 110 and outer surface 112 are additional layers 114 of fiber-reinforced thermoset materials formed to give the pipe 26 strength to withstand both longitudinal and hoop stresses.

Figure 17:
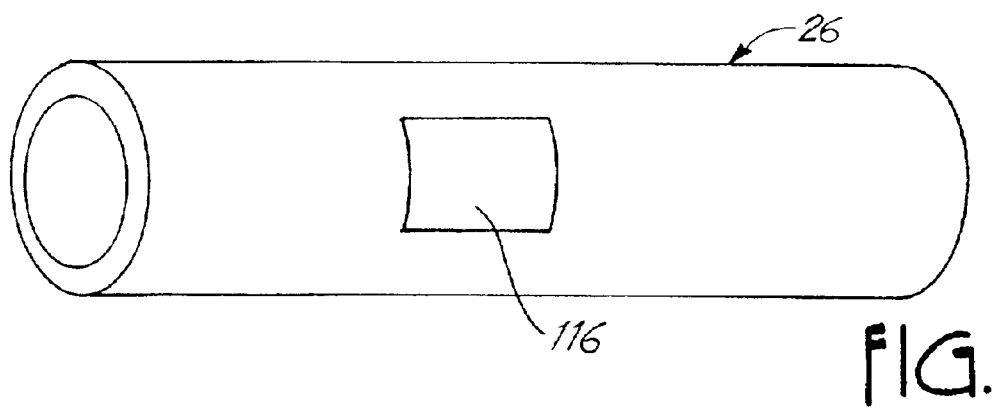
FIG. 17 is a perspective view of a composite pipe of the present invention having a window.

FIG. 17 illustrates an alternative embodiment of pipe section 26 utilizing a clear window 116 inserted into the wall of the pipe section 26 to allow visual inspection of the material flow therein. The window 116 maybe constructed within the pipe section 26 so as not to reduce the structural integrity at the window location. The window 116 may be formed of thermoset materials, fiber-reinforced composite materials or any other materials capable of withstanding the pressure and abrasion of contact with the contents of the pipe section 26.

Figure 18:
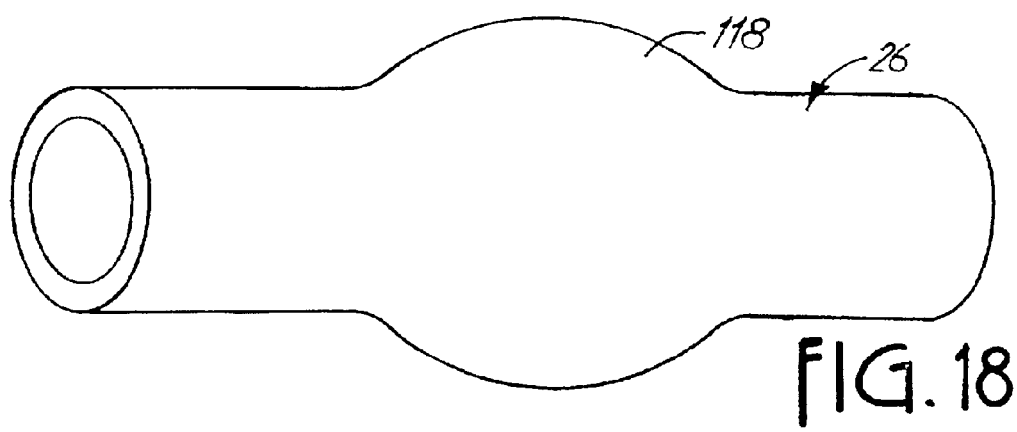
FIG. 18 is a perspective view of a composite pipe of the present invention with a failure induced bulge.

An advantage provided by the use of composite materials in constructing the piping system 14 is illustrated in FIG. 18. One embodiment of the fiber-reinforced thermoset composite pipe section 26 is shown. A bulge 118 has formed in the pipe section 26, indicating that the composite material is failing. In conventional piping (e.g. metal piping), failure occurs without warning by direct rupture of the pipe 26. The contents of the pipe 26 are able to exit through the rupture. The composite pipe section 26 of the present invention can be constructed so that when the pipe 26 begins to fail, the polymer and fiber network in the composite material plastically deform outward, forming the bulge 118. The visible bulge 118 allows the operator of the material transport system 10 to release the pressure on the boom section 22 before the pipe section 26 fully ruptures. The failed pipe section 26 can then be replaced. Previously, failure in the pipe meant that the pipe ruptured resulting in loss of contents and possible damage to surrounding equipment and workers. Therefore, the bulge 118 which forms in the current embodiment saves in downtime and cleaning, providing an economic advantage over prior art pipe systems. This benefit is enhanced by the fact that the location of points of highest wear can be predicted in advance along the piping system, and the composite pipe can be designed accordingly.

Figure 19:
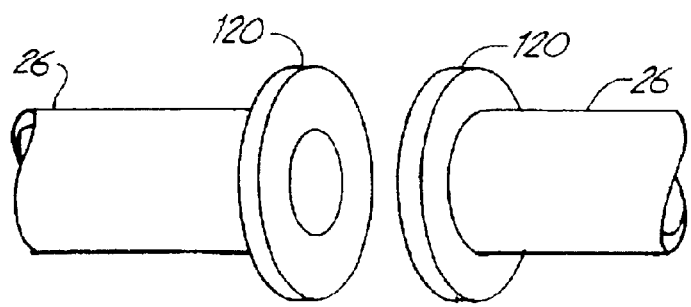
FIG. 19 is a perspective view of adjoining pipe sections of the present invention with mating flange connections.

As illustrated in FIG. 19, the composite materials used to form the piping 26 can be machined or manufactured to form various connections 120 between lengths of piping such as raised ends for mechanical clamp connections, bolted flanged connections, threaded connections, solvent welded connections and bell and spigot connections (among others known in the art). These connecting methods may be formed into piping 26 as it is layered and cured (as discussed), may be machined into the piping, or maybe formed separately and adhered to the piping. Additionally, piping bends and corners can be formed into the piping as the length of piping is layered and cured such that the bend and/or corner portion is integral to each pipe length. This is in contrast to metal pipes, which typically require a bend or corner portion to be mechanically connected (e.g., by a mechanical clamp, welding, etc) to straight portions of piping. It should also be noted that composite piping can be utilized with any combination of composite boom sections and metal boom sections, (either stiffened with composite layers or unstiffened) without departing from the scope of the invention.

Although the present invention has been described with reference to preferred embodiments, workers skilled in the art will recognize that changes may be made in form and detail without departing from the spirit and scope of the invention.

What is claimed is:

1. A boom system comprising:
    a first boom section having a distal end and a proximal end;
    a second boom section, the second boom section having a distal end and a proximal end, the proximal end rotatably coupled to the distal end of the first boom section;
    a concrete piping system supported by the boom sections;
    a concrete pump attached to the concrete piping system; and
    wherein at least one of the first and second boom sections is substantially formed from composite materials.

2. The boom system of claim 1 wherein the concrete piping system comprises a plurality of pipe sections and transitional piping connected between the pipe sections.

3. The boom system of claim 2 wherein at least some of the pipe sections and the transitional piping are formed from fiber reinforced composite materials.

4. The boom system of claim 3 wherein the inside surface of the composite piping sections are formed of material resistant to abrasion from concrete.

5. The boom system of claim 1 and further comprising:
    an actuator connected between the first boom section and the second boom section allowing the second boom section to be articulated with respect to the first boom section.

6. The boom system of claim 1 wherein the composite materials comprise multiple layers of reinforced fibers embedded in a matrix, the matrix comprised of thermoset resins, wherein the reinforced fibers provide corrosion resistance, high strength, stiffness and vibration damping.

7. The boom system of claim 1 and further comprising:
    a third boom section rotatably coupled to one of the first boom section and second boom section.

8. The boom system of claim 1, wherein at least one boom section comprises:
    a first fiber reinforced thermoset composite material layer including glass fibers in a vinyl ester matrix;

a second fiber reinforced thermoset composite material layer disposed over the first composite material layer, the second composite layer including carbon fibers in an epoxy matrix;

an aluminum flex core layer disposed over the second composite material layer;

a third fiber reinforced thermoset composite material layer disposed over the aluminum flex core layer, the third composite material layer including aramid fibers in a vinyl ester matrix; and a fourth fiber reinforced thermoset composite material layer disposed over the third composite material layer, the fourth composite material layer comprising glass fibers in a vinyl ester matrix.

9. The boom system of claim 1, wherein at least one boom section is substantially formed from metal and further comprising:

a stiffening layer attached to a surface of at least one metal boom section, wherein the stiffening layer is formed of a fiber-reinforced composite material including a plurality of fibers and a matrix material.

10. A material transport system comprising;

a truck; and a boom system mounted on the truck including:
a plurality of boom sections, each boom section engaged in articulated fashion with an adjacent boom section;
a piping system supported by the boom sections; and
a pump for flowable materials connected to the piping system;
wherein at least one of the boom sections are substantially formed from composite materials, the composite materials comprising multiple layers of fibers embedded in matrix material.

11. The boom system of claim 10 wherein the fibers are selected from a group consisting of carbon fibers, glass fibers, and aramid fibers.

12. The boom system of claim 10 wherein the matrix material is selected from a group consisting of polyesters, vinyl esters, and epoxy resins.

13. The material transport system of claim 10 wherein at least a portion of the piping system is formed from composite materials.

14. The material transport system of claim 10 wherein the pump is a concrete pump.

15. The material transport system of claim 10 wherein the pump is designed to pump water.

16. The material transport system of claim 10 wherein the pump is designed to pump municipal and industrial waste.

17. The material transport system of claim 10, wherein at least one boom section comprises:

a first fiber reinforced thermoset composite material layer including glass fibers in a vinyl ester matrix;

a second fiber reinforced thermoset composite material layer disposed over the first composite material layer, the second composite layer including carbon fibers in an epoxy matrix;

an aluminum flex core layer disposed over the second composite material layer;

a third fiber reinforced thermoset composite material layer disposed over the aluminum flex core layer, the third composite material layer including aramid fibers in a vinyl ester matrix; and a fourth fiber reinforced thermoset composite material layer disposed over the third composite material layer, the fourth composite material layer comprising glass fibers in a vinyl ester matrix.

18. The material transport system of claim 10, wherein at least one boom section is substantially formed from metal and further comprising:

a stiffening layer attached to a surface of at least one metal boom section, wherein the stiffening layer is formed of a fiber-reinforced composite material including a plurality of fibers and a matrix material.

19. A material transport system comprising:

a truck; and a boom system attached to the truck including:
a first boom section having a distal end and a proximal end;
a second boom section, the second boom section having a distal end and a proximal end, the proximal end rotatably coupled to the distal end of the first boom section;
a concrete piping system supported by the boom sections;
a concrete pump attached to the concrete piping system; and
wherein at least one of the first and second boom sections is substantially formed from composite materials.

20. The material transport system of claim 19, wherein at least one boom section comprises:

a first fiber reinforced thermoset composite material layer including glass fibers in a vinyl ester matrix;

a second fiber reinforced thermoset composite material layer disposed over the first composite material layer, the second composite layer including carbon fibers in an epoxy matrix;

an aluminum flex core layer disposed over the second composite material layer;

a third fiber reinforced thermoset composite material layer disposed over the aluminum flex core layer, the third composite material layer including aramid fibers in a vinyl ester matrix; and a fourth fiber reinforced thermoset composite material layer disposed over the third composite material layer, the fourth composite material layer comprising glass fibers in a vinyl ester matrix.

21. The material transport system of claim 19, wherein at least one boom section is substantially formed from metal and further comprising:

a stiffening layer attached to a surface of at least one metal boom section, wherein the stiffening layer is formed of a fiber-reinforced composite material including a plurality of fibers and a matrix material.

* * * * *